US009611619B1

(12) United States Patent
Zimmerman

(10) Patent No.: US 9,611,619 B1
(45) Date of Patent: Apr. 4, 2017

(54) HYDRAULIC HYBRID CIRCUIT WITH ENERGY STORAGE FOR EXCAVATORS OR OTHER HEAVY EQUIPMENT

(71) Applicant: CNH Industrial America LLC, New Holland, PA (US)

(72) Inventor: Joshua D. Zimmerman, Willow Springs, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/920,411

(22) Filed: Oct. 22, 2015

(51) Int. Cl.

| | |
|---|---|
| ***F16D 31/02*** | (2006.01) |
| ***E02F 3/42*** | (2006.01) |
| ***F15B 9/04*** | (2006.01) |
| ***F15B 9/16*** | (2006.01) |
| ***F15B 1/027*** | (2006.01) |
| ***F15B 1/02*** | (2006.01) |
| ***E02F 3/32*** | (2006.01) |
| ***E02F 9/22*** | (2006.01) |
| ***E02F 9/12*** | (2006.01) |
| ***F15B 21/14*** | (2006.01) |
| ***F15B 11/17*** | (2006.01) |
| *E02F 9/20* | (2006.01) |

(52) U.S. Cl.

CPC ................ *E02F 3/425* (2013.01); *E02F 3/32* (2013.01); *E02F 9/123* (2013.01); *E02F 9/2217* (2013.01); *E02F 9/2292* (2013.01); *E02F 9/2296* (2013.01); *F15B 1/024* (2013.01); *F15B 1/027* (2013.01); *F15B 9/04* (2013.01); *F15B 9/16* (2013.01); *F15B 11/17* (2013.01); *F15B 21/14* (2013.01); *E02F 9/2025* (2013.01); *E02F 9/2285* (2013.01)

(58) Field of Classification Search

CPC F15B 1/024; F15B 11/17; F15B 21/14; E02F 9/2217

See application file for complete search history.

(56) References Cited

U.S. PATENT DOCUMENTS

| | | | | |
|---|---|---|---|---|
| 6,971,195 | B2 | 12/2005 | Kondou | |
| 7,565,801 | B2 * | 7/2009 | Tozawa .................. | F15B 21/14 60/414 |
| 2011/0308242 | A1 | 12/2011 | Pfaff et al. | |
| 2012/0233991 | A1 | 9/2012 | Ivantysynova et al. | |

(Continued)

OTHER PUBLICATIONS

"Hybrid Displacement Controlled Multi-Actuator Hydraulic Systems", Joshua Zimmerman and Monika Ivantysynova, The Twelfth Scandinavian International Conference on Fluid Power, May 18-20, 2011 (17 pages).

*Primary Examiner* — Michael Leslie

(74) *Attorney, Agent, or Firm* — Patrick M. Sheldrake

(57) ABSTRACT

A hydraulic system powered by a shaft of an engine to control a plurality of hydraulic cylinders including at least one boom lift hydraulic cylinder coupled to a boom to pivot the boom about a horizontal axis, wherein a first variable displacement pump/motor and a second variable displacement pump/motor can be connected to provide a higher flow to the at least one boom lift hydraulic cylinder than a flow achieved by one of the first variable displacement pump/motor or the second variable displacement pump/motor, and a high-pressure accumulator and the first variable displacement pump/motor and the second variable displacement pump/motor can add power back to the engine shaft.

4 Claims, 21 Drawing Sheets

(56) References Cited

U.S. PATENT DOCUMENTS

| | | | | |
|---|---|---|---|---|
| 2013/0098012 | A1* | 4/2013 | Opdenbosch ........... | F15B 1/024 60/413 |
| 2014/0119867 | A1 | 5/2014 | Wen et al. | |
| 2014/0166114 | A1 | 6/2014 | Wang et al. | |

* cited by examiner

HYDRAULIC HYBRID CIRCUIT WITH ENERGY STORAGE FOR EXCAVATORS OR OTHER HEAVY EQUIPMENT

BACKGROUND OF THE INVENTION

1. Field of the Invention

The present invention relates to hydraulic circuits for excavators or other heavy equipment, and, more specifically to hydraulic circuits which recover and store energy in a compact and efficient manner.

2. Description of the Related Art

It is well known in the art to use hydraulic circuits to provide power to various devices of excavator or other heavy equipment vehicles. These devices can include propulsion, steering, braking, and the manipulation of various implements. Typically, an engine provides power to a shaft, which in turn provides power to various components in the hydraulic circuit.

Hydraulic circuits are composed of many components, including cylinders, pumps, motors, several types of valves, and accumulators. These components are placed in series and/or parallel to each other in order to direct hydraulic fluid in a particular direction and to provide specific functions. Depending upon the setting of directional valves, for example, various circuits can be created by isolating and/or including different components.

During use, and depending upon the operation desired, hydraulic circuits consume various quantities of energy from the engine and from its own components. There is often a tradeoff, for example, when using several implements on the same circuit: while one implement may be used at peak efficiency, other implements may as a result of the circuit design operate at less than peak efficiency. In addition, the hydraulic circuit, when in operation, puts a load on the engine and therefore requires the engine to consume more fuel in order to keep the hydraulic system operating.

What is therefore needed in the art is a hydraulic circuit which is highly efficient, reduces engine power requirements, and may reduce the quantity of system components needed.

SUMMARY OF THE INVENTION

The present invention provides a hydraulic circuit for an excavator or other heavy equipment machine, with energy-efficient features that provide for several configurations and reduce the quantity of components usually required to perform the desired functions.

The invention in one form is directed to an excavator or other heavy equipment machine, including a hydraulic circuit with multiple components powered by an engine. The hydraulic circuit includes a boom swing hydraulic motor or travel hydraulic motor and at least one boom lift hydraulic cylinder or any hydraulic linear actuator powered by two variable displacement pump/motors, a charge motor, a high-pressure accumulator with relief valve, a low-pressure accumulator with relief valve, a bi-directional valve, five load-holding valves, a check valve, and a pilot-operated check valve.

The invention in another form is directed to an excavator or other heavy equipment machine, including a hydraulic circuit with multiple components powered by an engine. The hydraulic circuit includes a boom swing hydraulic motor and at least one boom lift hydraulic cylinder powered by two variable displacement pump/motors, a charge motor, a high-pressure accumulator with relief valve, a low-pressure accumulator with relief valve, a bi-directional valve, four load-holding valves, a check valve, and two pilot-operated check valves.

The invention in still another form is directed to an excavator or other heavy equipment machine, including a hydraulic circuit with multiple components powered by an engine. The hydraulic circuit includes a boom swing hydraulic motor and at least one boom lift hydraulic cylinder powered by two variable displacement pump/motors, a charge motor, a high-pressure accumulator with relief valve, a low-pressure accumulator with relief valve, a bi-directional valve, four load-holding valves, two check valves, and a three-position valve.

The invention in still another form is directed to an excavator or other heavy equipment machine, including a hydraulic circuit with multiple components powered by an engine. The hydraulic circuit includes a boom swing hydraulic motor and at least one boom lift hydraulic cylinder powered by two variable displacement pump/motors, a charge motor, a high-pressure accumulator with relief valve, a low-pressure accumulator with relief valve, two check valves, and three load-holding valves.

An advantage of the present invention is the efficiency of the system is only limited by components themselves and is not inherent to the system design.

Another advantage of the present invention is to combine the two pump/motors to provide a higher flow at high power or power recovery to the boom lift hydraulic cylinders, which is often needed especially during rapid lowering.

Another advantage of the present invention is the combining of the two pump/motors reduces the pump/motor size required for the pump/motor which primarily controls the boom lift hydraulic cylinders.

Another advantage of the present invention is the design allows large inertial or external loads to be recovered by the machine and stored in the form of high pressure hydraulic fluid in an accumulator, which can then be reused at a more opportune time to save fuel.

Still another advantage of the present invention is that as a result of the presence of the high pressure accumulator and the variable displacement pump/motors, the system is capable of adding power back on to the engine shaft when there is stored energy. This can result in power boosts for higher performance, or engine power leveling to allow reduced engine size and power requirements.

Another advantage of the present invention is the hydraulic power could be used as a hydraulic starter for the engine, allowing engine shutoff technologies to preserve fuel.

Yet another advantage of the present invention is that the combination of all the features in the hydraulic circuit allows advanced control algorithms to be designed to ensure that the combined system of the engine and the hydraulics are working at the overall highest efficiency in order to minimize the overall fuel consumption of the machine.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "system", "motor", "pump", and "valve" are used principally throughout this specification for convenience but it is to be understood that these terms are not intended to be limiting. It is also understood and well-known in the art that variable displacement pump/motors can be used to deliver fluid to components as well as pull fluid from components.

Figure 1:
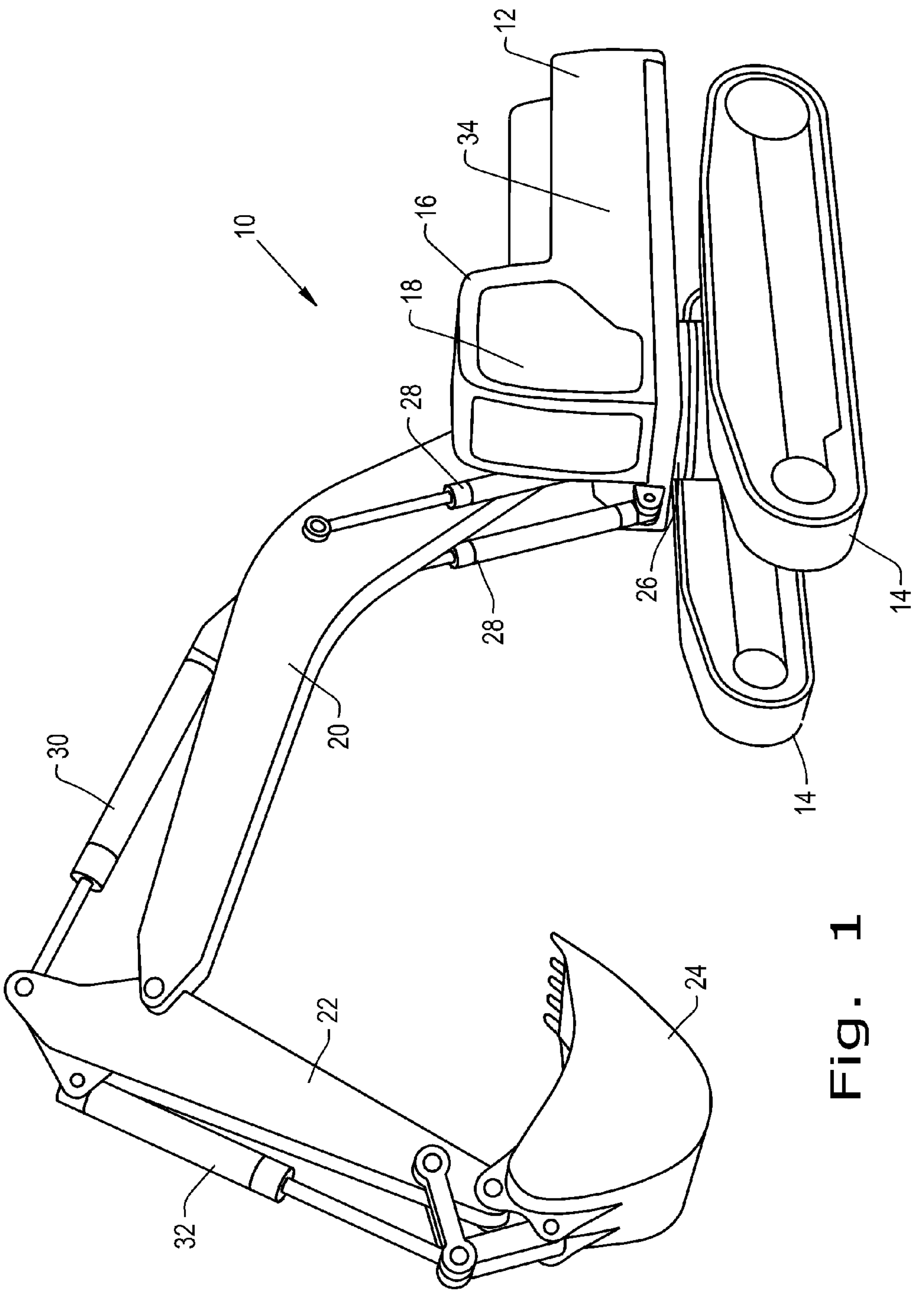
FIG. 1 is a side view of an embodiment of a heavy machine in the form of an excavator, which may include an embodiment of a hydraulic circuit as disclosed herein.

Referring now to the drawings, and more particularly to FIG. 1, there is shown a heavy machine in the form of an excavator 10, which generally includes a chassis 12, ground engaging tracks 14, operator cab 16, operator controls 18, boom 20, dipper 22, implement 24, boom swing hydraulic motor 26, boom lift hydraulic cylinders 28, dipper hydraulic cylinder 30, and implement hydraulic cylinder 32.

Motive force is applied to tracks 14 through a power plant in the form of a diesel engine 34 and a transmission (not shown). Although excavator 10 is shown as including tracks 14, it is also to be understood that excavator 10 may include wheels.

Figure 2:
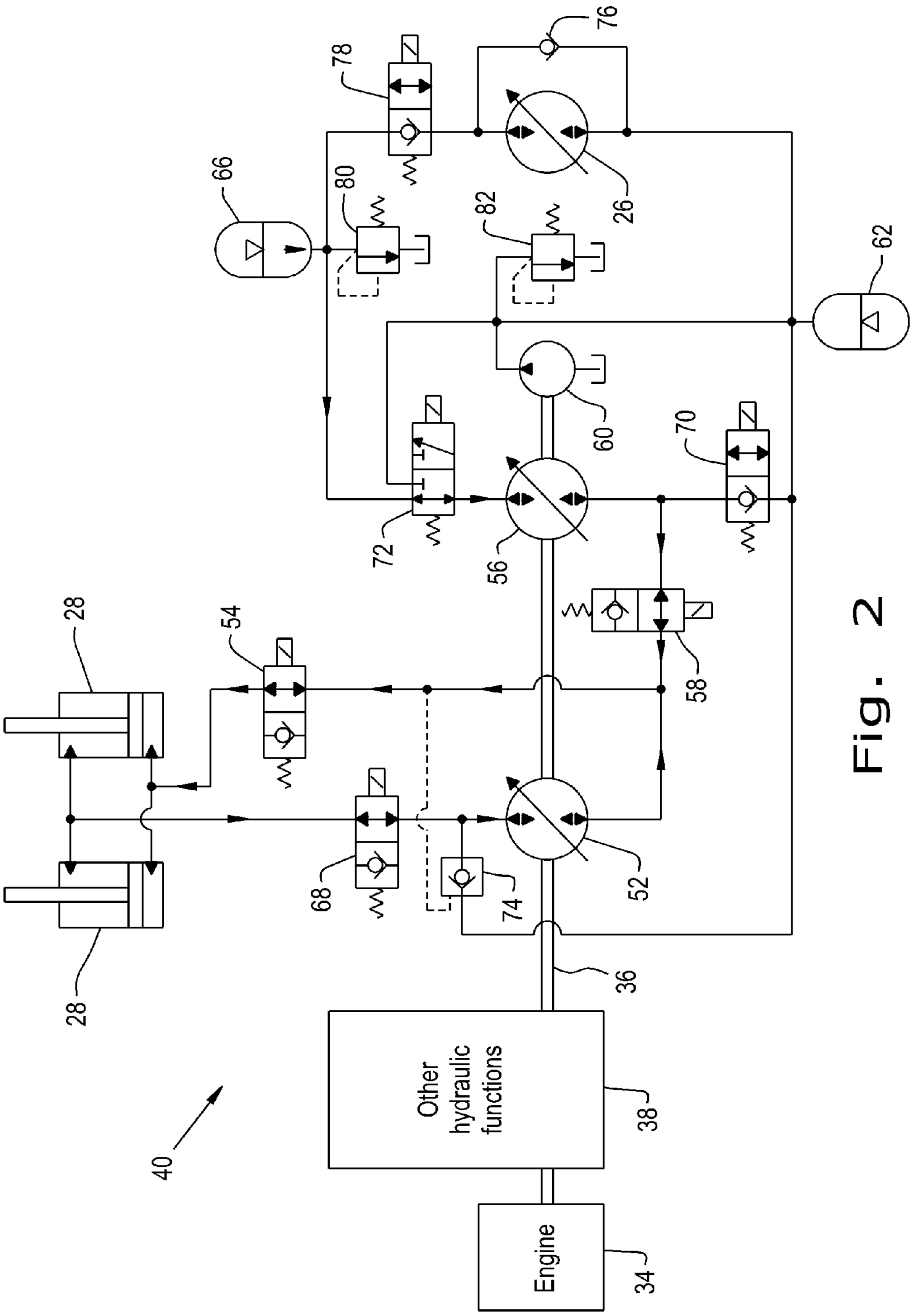
FIG. 2 is a schematic representation of an embodiment of a hydraulic circuit for the excavator of FIG. 1 or other heavy equipment machine.

According to an aspect of the present invention, and referring now to FIG. 2, there is shown a hydraulic circuit 40 which is powered by engine shaft 36. In this and all subsequent embodiments of the present invention, there may be other hydraulic functions 38 in the hydraulic circuit. Also present in this and each subsequent embodiment are high pressure accumulator relief valve 80, low pressure accumulator relief valve 82, fourth load-holding valve 78, and boom swing hydraulic motor first check valve 76.

First variable displacement pump/motor 52 directs a hydraulic fluid under load pressure through the first load-holding valve 54 and on to the head side of boom lift hydraulic cylinders 28. Simultaneously, second variable displacement pump/motor 56 directs a hydraulic fluid under load pressure through third load-holding valve 58 and first load-holding valve 54 and on to the head side of the boom lift hydraulic cylinders 28. Also simultaneously, charge pump 60 directs a hydraulic fluid under low pressure to low pressure accumulator 62, boom swing hydraulic motor 26, first variable displacement pump/motor 52, and second variable displacement pump/motor 56. High pressure accumulator 66 assists second variable displacement pump/motor 56. Low pressure hydraulic fluid is returned from the rod side of boom lift hydraulic cylinders 28 through second load-holding valve 68 to first variable displacement pump/motor 52.

Figure 3:
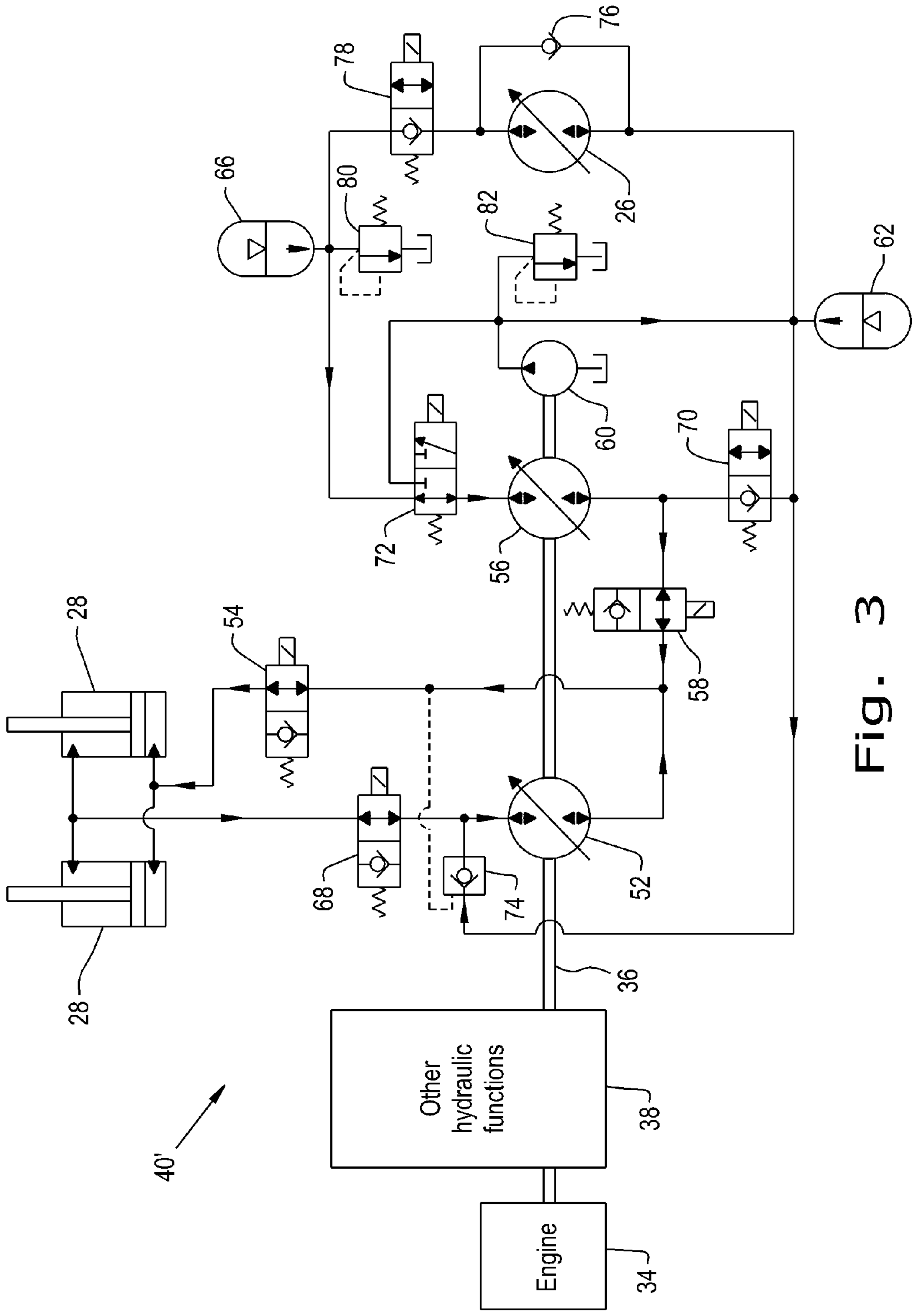
FIG. 3 is a schematic representation of a second configuration of the embodiment of FIG. 2.

According to another configuration of the present invention, and referring now to FIG. 3, there is shown a hydraulic circuit 40' which is powered by engine shaft 36. First variable displacement pump/motor 52 directs a hydraulic fluid under load pressure through the first load-holding valve 54 and on to the head side of boom lift hydraulic cylinders 28. Simultaneously, second variable displacement pump/motor 56 directs a hydraulic fluid under load pressure through third load-holding valve 58 and first load-holding valve 54 and on to the head side of the boom lift hydraulic cylinders 28. Also simultaneously, charge pump 60 directs a hydraulic fluid under low pressure to boom swing hydraulic motor 26, first variable displacement pump/motor 52, and second variable displacement pump/motor 56. High pressure accumulator 66 assists second variable displacement pump/motor 56. Low pressure accumulator 62 assists first variable displacement pump/motor 52. Low pressure hydraulic fluid is returned from the rod side of boom lift hydraulic cylinders 28 through second load-holding valve 68 to first variable displacement pump/motor 52.

Figure 4:
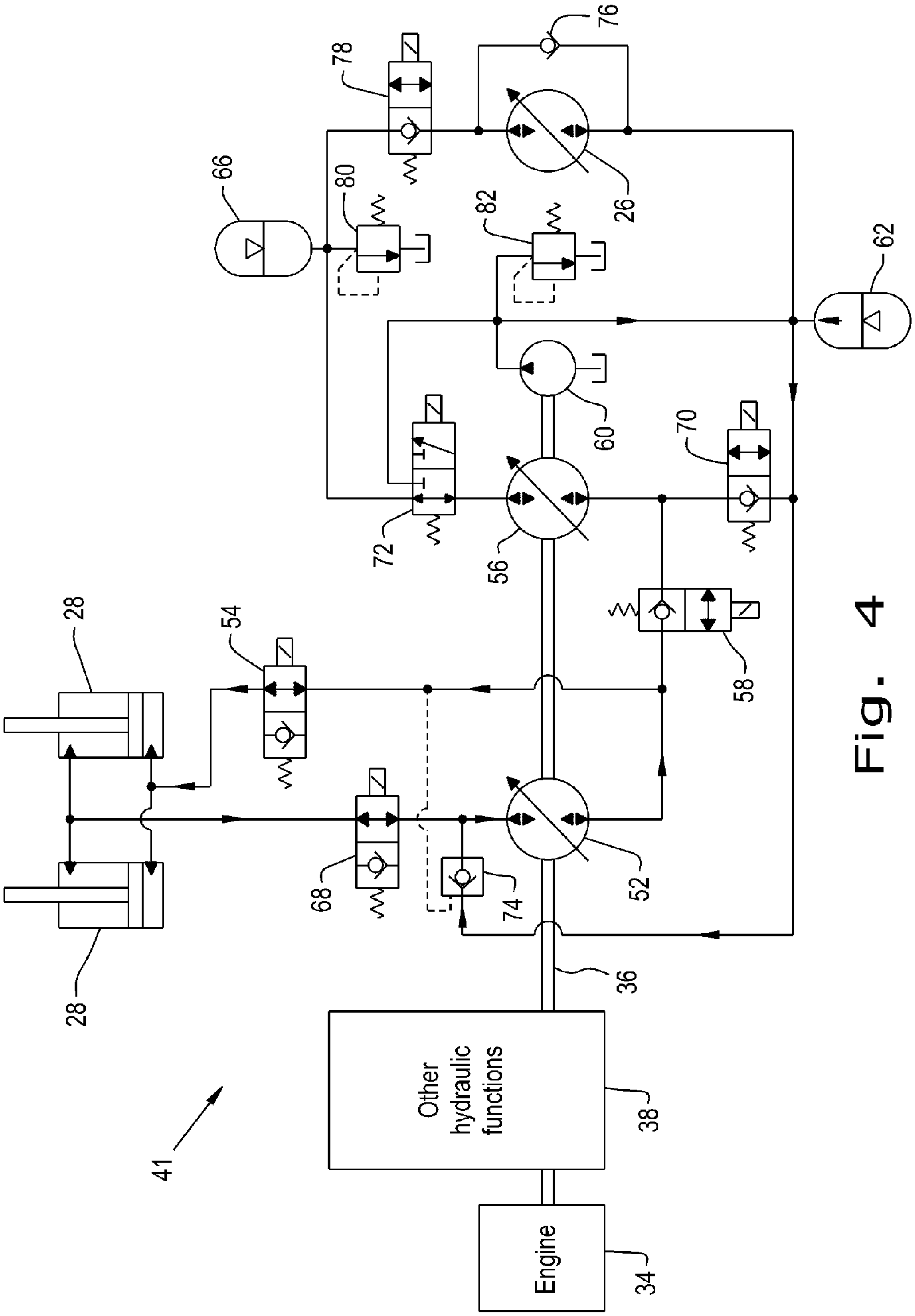
FIG. 4 is a schematic representation of a third configuration of the embodiment of FIG. 2.

According to another configuration of the present invention, and referring now to FIG. 4, there is shown a hydraulic circuit 41 which is powered by engine shaft 36. First variable displacement pump/motor 52 directs a hydraulic fluid under load pressure through the first load-holding valve 54 and on to the head side of boom lift hydraulic cylinders 28. Simultaneously, charge pump 60 directs a hydraulic fluid under low pressure to boom swing hydraulic motor 26, first variable displacement pump/motor 52, and second variable displacement pump/motor 56. Low pressure accumulator 62 assists first variable displacement pump/motor 52. Low pressure hydraulic fluid is returned from the rod side of boom lift hydraulic cylinders 28 through second load-holding valve 68 to first variable displacement pump/motor 52.

Figure 5:
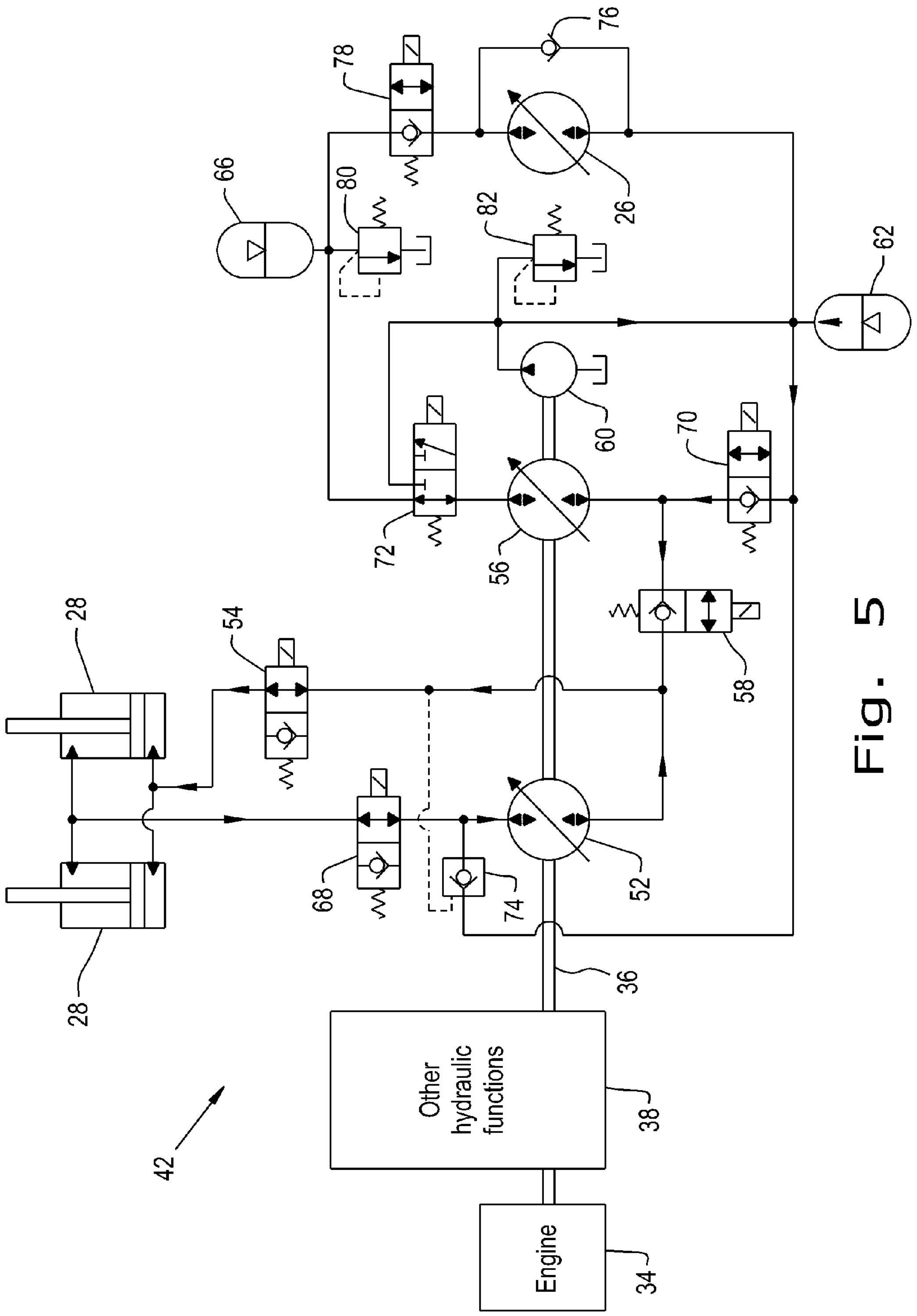
FIG. 5 is a schematic representation of a fourth configuration of the embodiment of FIG. 2.

According to another configuration of the present invention, and referring now to FIG. 5, there is shown a hydraulic circuit 42 which is powered by engine shaft 36. First variable displacement pump/motor 52 directs a hydraulic fluid under low pressure through the first load-holding valve 54 and on to the head side of boom lift hydraulic cylinders 28. Simultaneously, second variable displacement pump/motor 56 directs a hydraulic fluid under low pressure through third load-holding valve 58 and first load-holding valve 54 and on to the head side of the boom lift hydraulic cylinders 28. Also simultaneously, charge pump 60 directs a hydraulic fluid under low pressure to boom swing hydraulic motor 26, first variable displacement pump/motor 52, and second variable displacement pump/motor 56. Low pressure accumulator 62 assists first variable displacement pump/motor 52. Load pressure hydraulic fluid is returned from the rod side of boom lift hydraulic cylinders 28 through second load-holding valve 68 to first variable displacement pump/motor 52.

Figure 6:
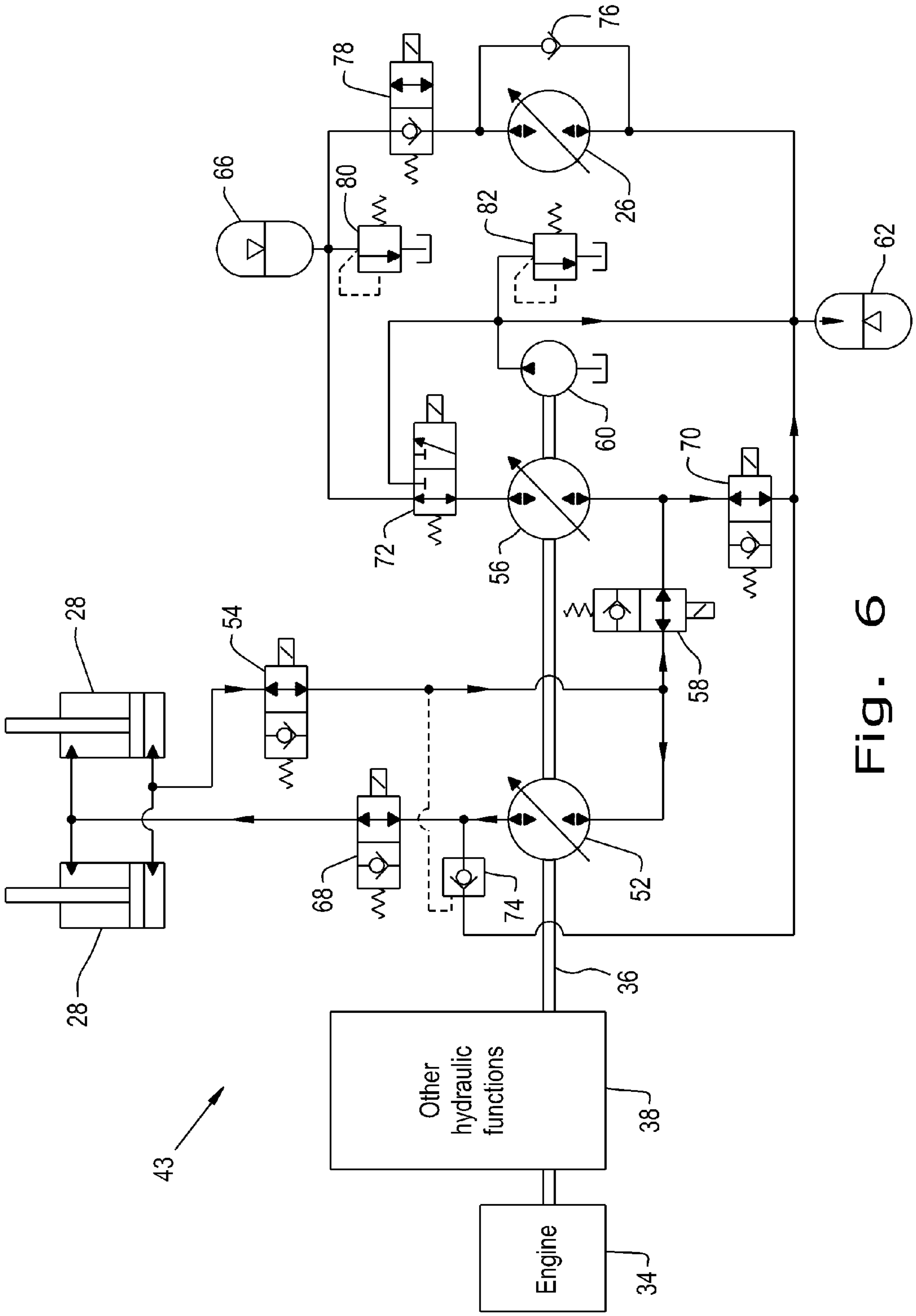
FIG. 6 is a schematic representation of a fifth configuration of the embodiment of FIG. 2.

According to another configuration of the present invention, and referring now to FIG. 6, there is shown a hydraulic circuit 43 which is powered by engine shaft 36. First variable displacement pump/motor 52 directs a hydraulic fluid under load pressure through the second load-holding valve 68 and on to the rod side of boom lift hydraulic cylinders 28. Simultaneously, second variable displacement pump/motor 56 directs a hydraulic fluid under low pressure through fifth load-holding valve 70 to low pressure accumulator 62 and boom swing hydraulic motor 26. Also simultaneously, charge pump 60 directs a hydraulic fluid under low pressure to low pressure accumulator 62, boom swing hydraulic motor 26, first variable displacement pump/motor 52, and second variable displacement pump/motor 56. Low pressure hydraulic fluid is returned from the head side of boom lift hydraulic cylinders 28 through first load-holding valve 54 to first variable displacement pump/motor 52; and through first load-holding valve 54, third load-holding valve 58, and fifth load-holding valve 70 to low pressure accumulator 62 and boom swing hydraulic motor 26.

Figure 7:
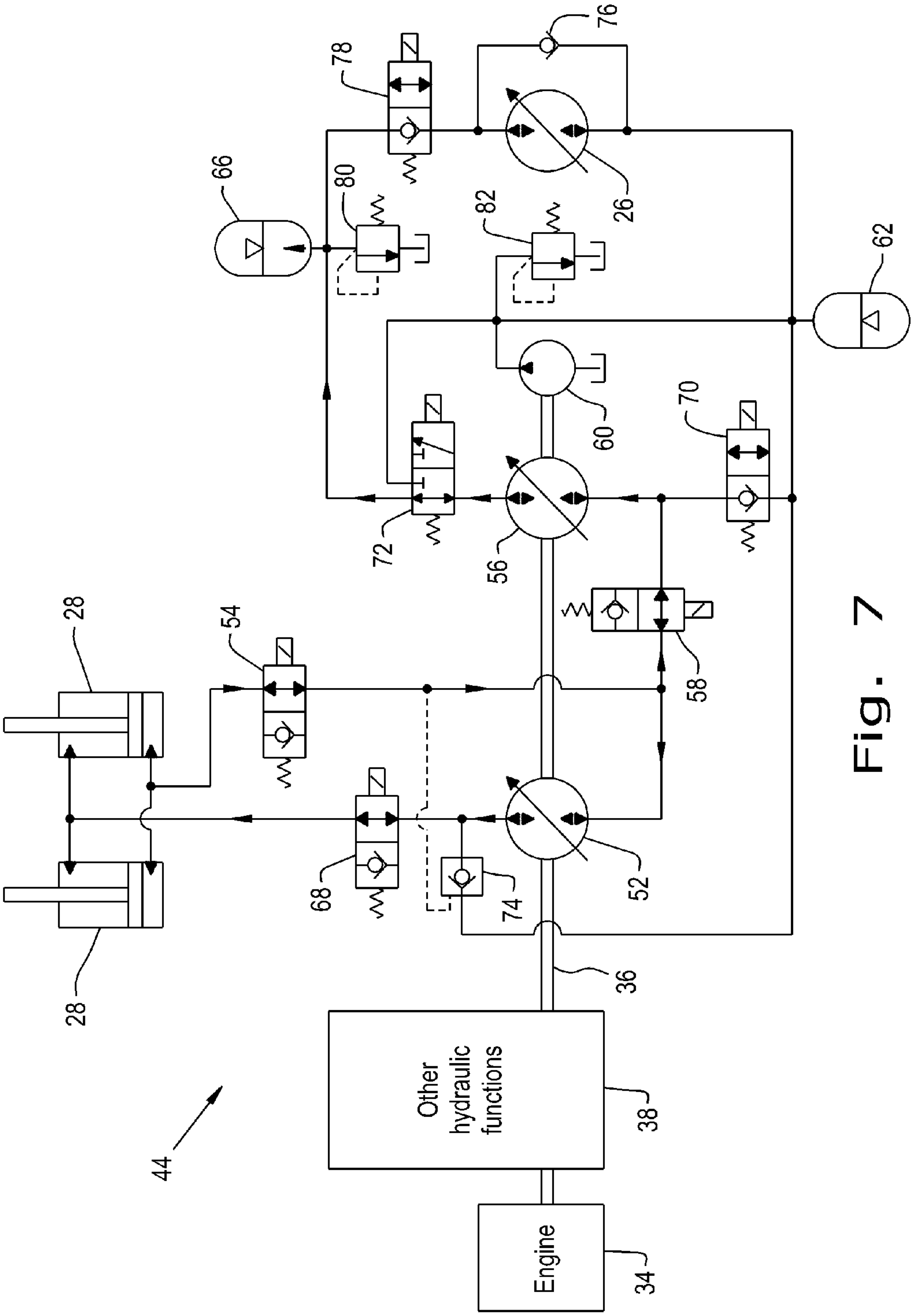
FIG. 7 is a schematic representation of a sixth configuration of the embodiment of FIG. 2.

According to another configuration of the present invention, and referring now to FIG. 7, there is shown a hydraulic circuit 44 which is powered by engine shaft 36. First variable displacement pump/motor 52 directs a hydraulic fluid under load pressure through the second load-holding valve 68 and on to the rod side of boom lift hydraulic cylinders 28. Simultaneously, second variable displacement pump/motor 56 directs a hydraulic fluid under high pressure through bi-directional valve 72 to high pressure accumulator 66. Also simultaneously, charge pump 60 directs a hydraulic fluid under low pressure to low pressure accumulator 62, boom swing hydraulic motor 26, first variable displacement pump/motor 52, and second variable displacement pump/motor 56. Low pressure hydraulic fluid is returned from the head side of boom lift hydraulic cylinders 28 through first load-holding valve 54 to first variable displacement pump/motor 52, and through first load-holding valve 54 and third load-holding valve 58 to second variable displacement pump/motor 56.

Figure 8:
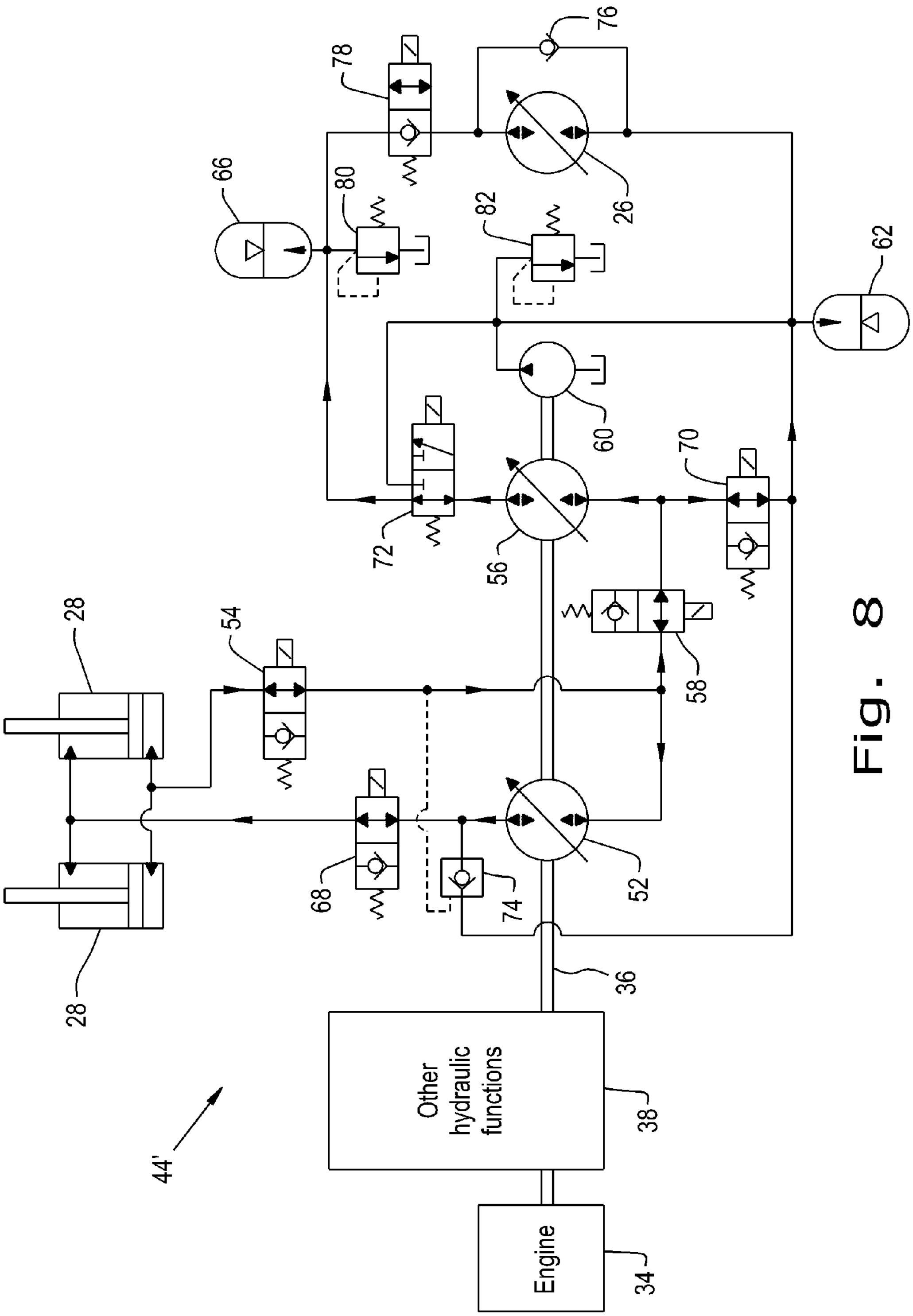
FIG. 8 is a schematic representation of a seventh configuration of the embodiment of FIG. 2.

According to another configuration of the present invention, and referring now to FIG. 8, there is shown a hydraulic circuit 44' which is powered by engine shaft 36. First variable displacement pump/motor 52 directs a hydraulic fluid under load pressure through the second load-holding valve 68 and on to the rod side of boom lift hydraulic cylinders 28. Simultaneously, second variable displacement pump/motor 56 directs a hydraulic fluid under high pressure through bi-directional valve 72 to high pressure accumulator 66. Also simultaneously, charge pump 60 directs a hydraulic fluid under low pressure to low pressure accumulator 62, boom swing hydraulic motor 26, first variable displacement pump/motor 52, and second variable displacement pump/motor 56. Low pressure hydraulic fluid is returned from the head side of boom lift hydraulic cylinders 28 through first load-holding valve 54 to first variable displacement pump/motor 52; and through first load-holding valve 54, third load-holding valve 58, and fifth load-holding valve 70 to low pressure accumulator 62 and boom swing hydraulic motor 26.

Figure 9:
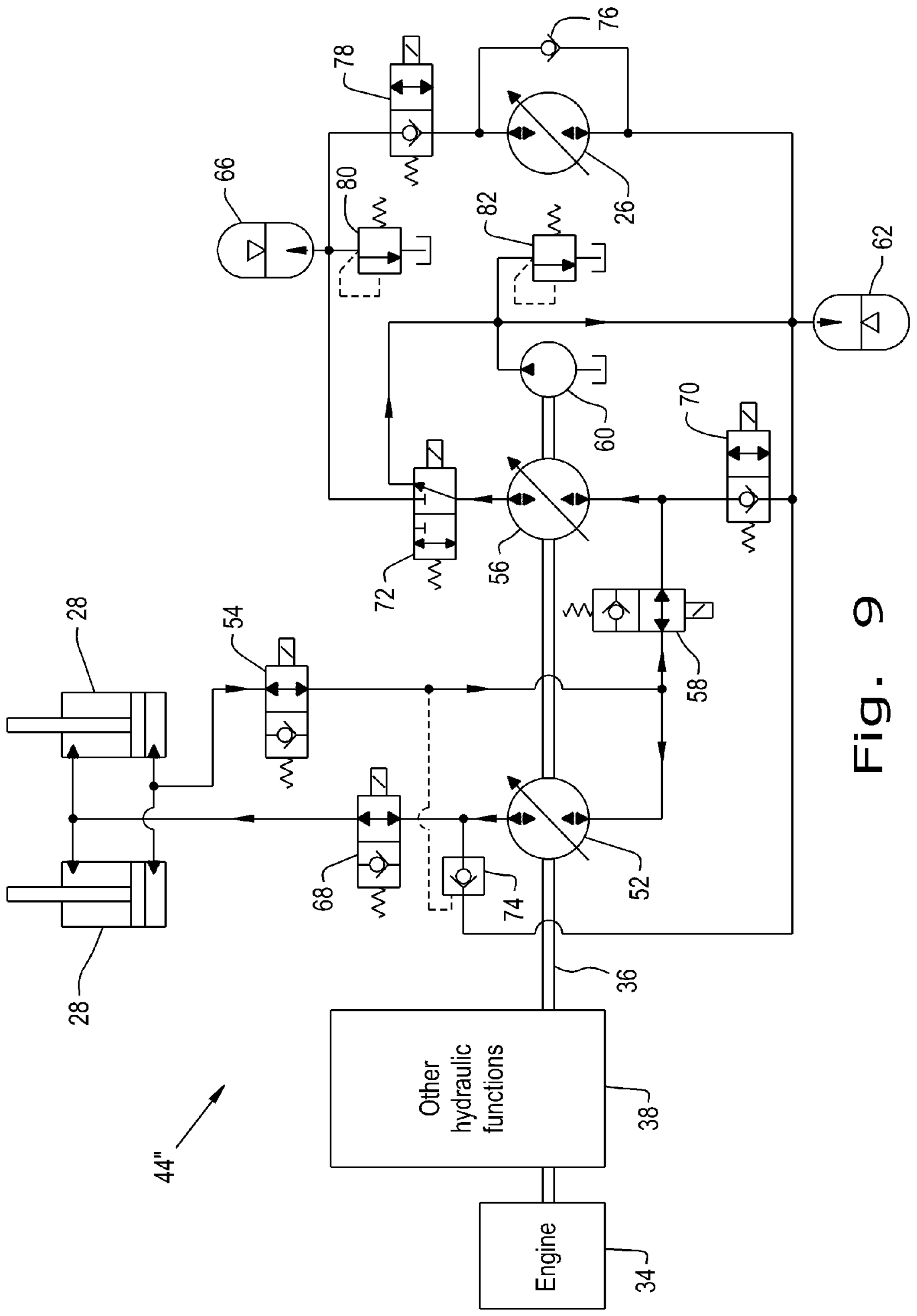
FIG. 9 is a schematic representation of a eighth configuration of the embodiment of FIG. 2.

According to another configuration of the present invention, and referring now to FIG. 9, there is shown a hydraulic circuit 44" which is powered by engine shaft 36. First variable displacement pump/motor 52 directs a hydraulic fluid under load pressure through the second load-holding valve 68 and on to the rod side of boom lift hydraulic cylinders 28. Simultaneously, second variable displacement pump/motor 56 directs a hydraulic fluid under low pressure through bi-directional valve 72 to low pressure accumulator 62 and boom swing hydraulic motor 26. Also simultaneously, charge pump 60 directs a hydraulic fluid under low pressure to low pressure accumulator 62, boom swing hydraulic motor 26, first variable displacement pump/motor 52, and second variable displacement pump/motor 56. Low pressure hydraulic fluid is returned from the head side of boom lift hydraulic cylinders 28 through first load-holding valve 54 to first variable displacement pump/motor 52, and through first load-holding valve 54 and third load-holding valve 58 to second variable displacement pump/motor 56.

Figure 10:
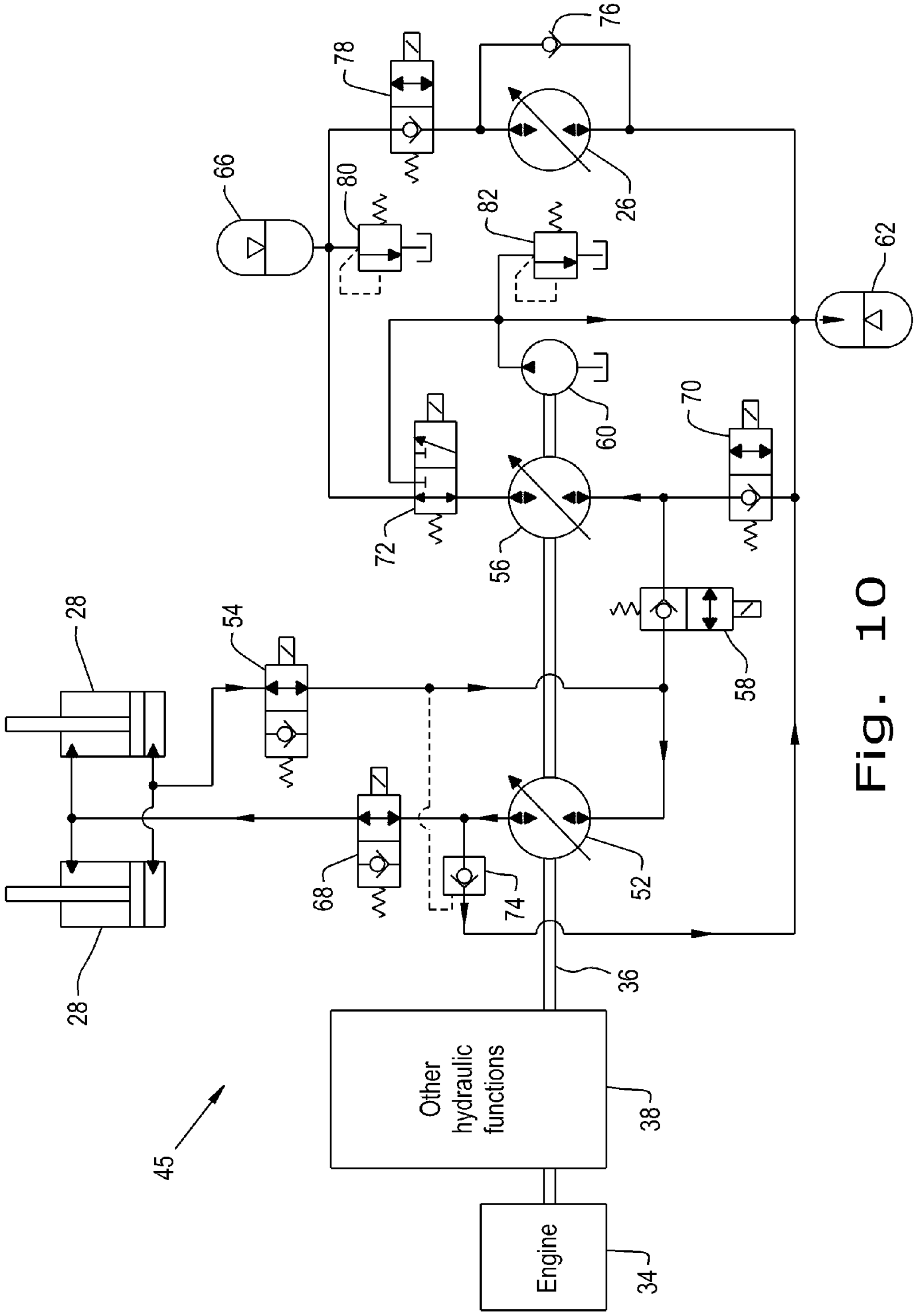
FIG. 10 is a schematic representation of a ninth configuration of the embodiment of FIG. 2.

According to another configuration of the present invention, and referring now to FIG. 10, there is shown a hydraulic circuit 45 which is powered by engine shaft 36. First variable displacement pump/motor 52 directs a hydraulic fluid under low pressure through the second load-holding valve 68 and on to the rod side of boom lift hydraulic cylinders 28; also, first pilot-operated check valve 74 is activated and hydraulic fluid is delivered under low pressure to second variable displacement pump/motor 56, low pressure accumulator 62 and boom swing hydraulic motor 26. Simultaneously, second variable displacement pump/motor 56 directs a hydraulic fluid under high pressure through bi-directional valve 72 to high pressure accumulator 66. Also simultaneously, charge pump 60 directs a hydraulic fluid under low pressure to low pressure accumulator 62, boom swing hydraulic motor 26, first variable displacement pump/motor 52, and second variable displacement pump/motor 56. Load pressure hydraulic fluid is returned from the head side of boom lift hydraulic cylinders 28 through first load-holding valve 54 to first variable displacement pump/motor 52.

Figure 11:
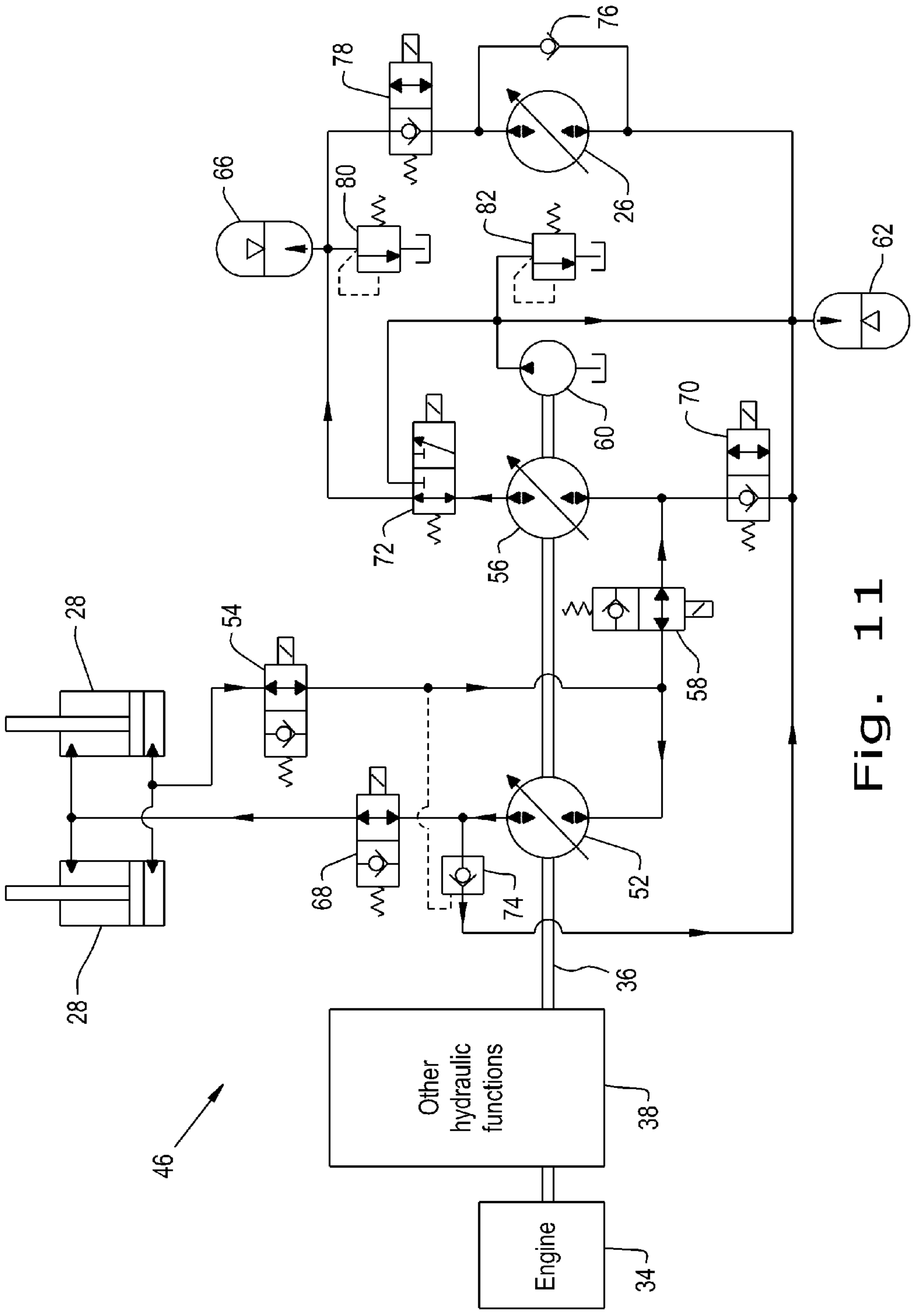
FIG. 11 is a schematic representation of a tenth configuration of the embodiment of FIG. 2.

According to another configuration of the present invention, and referring now to FIG. 11, there is shown a hydraulic circuit 46 which is powered by engine shaft 36. First variable displacement pump/motor 52 directs a hydraulic fluid under low pressure through the second load-holding valve 68 and on to the rod side of boom lift hydraulic cylinders 28; also, first pilot-operated check valve 74 is activated and hydraulic fluid is delivered under low pressure to low pressure accumulator 62 and boom swing hydraulic motor 26. Simultaneously, second variable displacement pump/motor 56 directs a hydraulic fluid under high pressure through bi-directional valve 72 to high pressure accumulator

66. Also simultaneously, charge pump 60 directs a hydraulic fluid under low pressure to low pressure accumulator 62, boom swing hydraulic motor 26, first variable displacement pump/motor 52, and second variable displacement pump/motor 56. Load pressure hydraulic fluid is returned from the head side of boom lift hydraulic cylinders 28 through first load-holding valve 54 to first variable displacement pump/motor 52, and through first load-holding valve 54 and third load-holding valve 58 to second variable displacement pump/motor 56.

Figure 12:
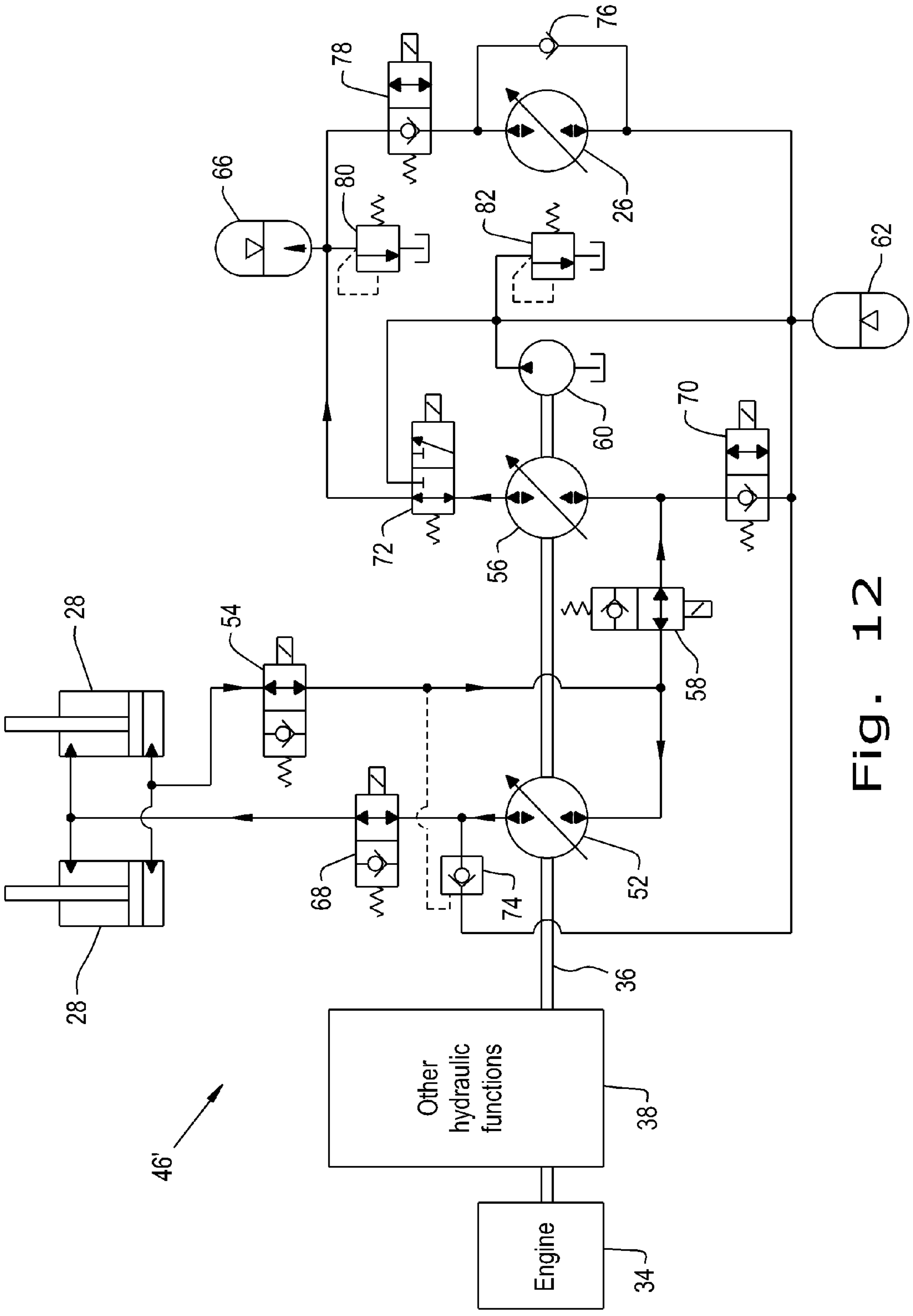
FIG. 12 is a schematic representation of a eleventh configuration of the embodiment of FIG. 2.

According to another configuration of the present invention, and referring now to FIG. 12, there is shown a hydraulic circuit 46' which is powered by engine shaft 36. First variable displacement pump/motor 52 directs a hydraulic fluid under low pressure through the second load-holding valve 68 and on to the rod side of boom lift hydraulic cylinders 28. Simultaneously, second variable displacement pump/motor 56 directs a hydraulic fluid under high pressure through bi-directional valve 72 to high pressure accumulator 66. Also simultaneously, charge pump 60 directs a hydraulic fluid under low pressure to low pressure accumulator 62, boom swing hydraulic motor 26, first variable displacement pump/motor 52, and second variable displacement pump/motor 56. Load pressure hydraulic fluid is returned from the head side of boom lift hydraulic cylinders 28 through first load-holding valve 54 to first variable displacement pump/motor 52, and through first load-holding valve 54 and third load-holding valve 58 to second variable displacement pump/motor 56.

Figure 13:
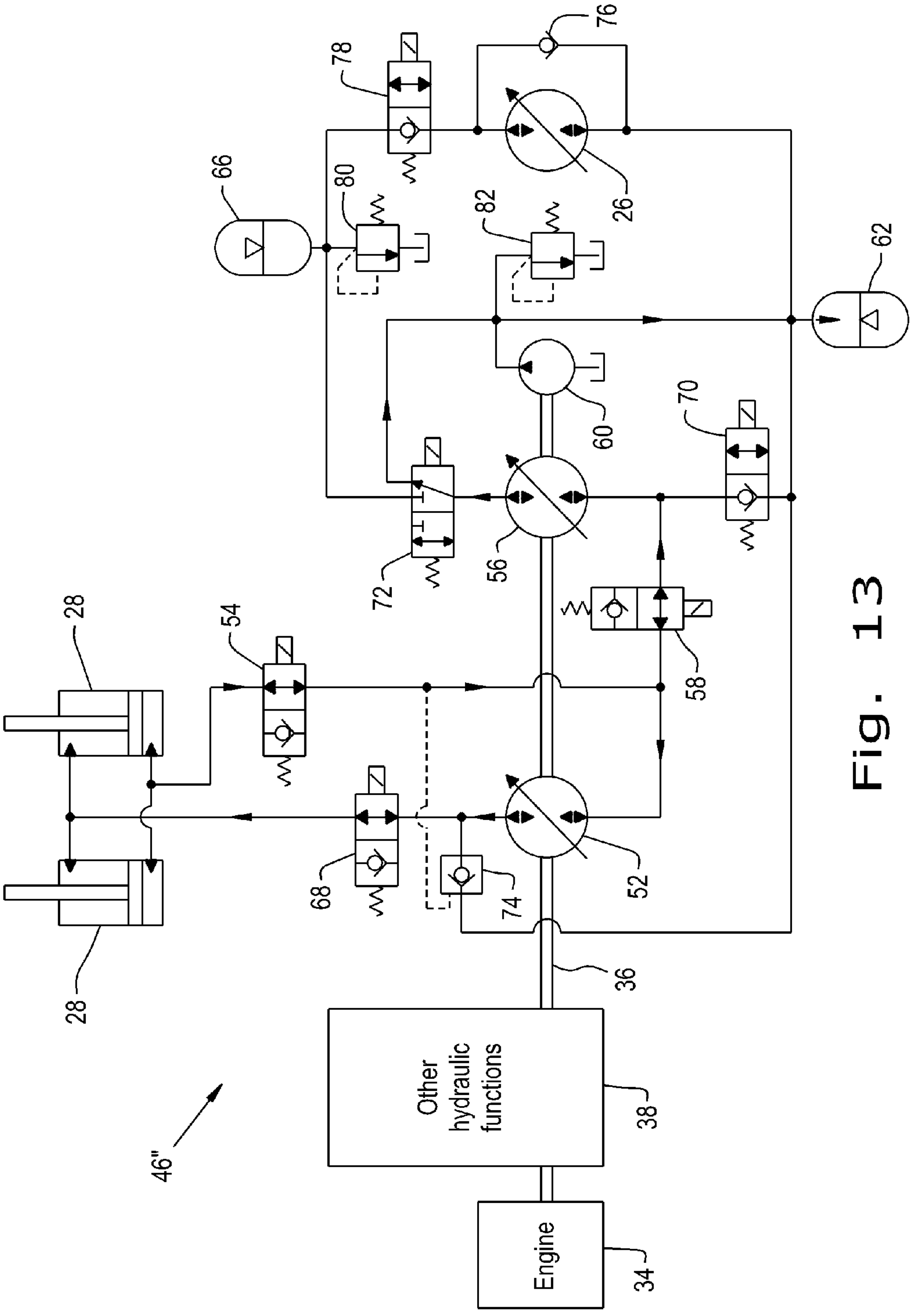
FIG. 13 is a schematic representation of a twelfth configuration of the embodiment of FIG. 2.

According to another configuration of the present invention, and referring now to FIG. 13, there is shown a hydraulic circuit 46" which is powered by engine shaft 36. First variable displacement pump/motor 52 directs a hydraulic fluid under low pressure through the second load-holding valve 68 and on to the rod side of boom lift hydraulic cylinders 28. Simultaneously, second variable displacement pump/motor 56 directs a hydraulic fluid under low pressure through bi-directional valve 72 to low pressure accumulator 62 and boom swing hydraulic motor 26. Also simultaneously, charge pump 60 directs a hydraulic fluid under low pressure to low pressure accumulator 62, boom swing hydraulic motor 26, first variable displacement pump/motor 52, and second variable displacement pump/motor 56. Load pressure hydraulic fluid is returned from the head side of boom lift hydraulic cylinders 28 through first load-holding valve 54 to first variable displacement pump/motor 52, and through first load-holding valve 54 and third load-holding valve 58 to second variable displacement pump/motor 56.

Figure 14:
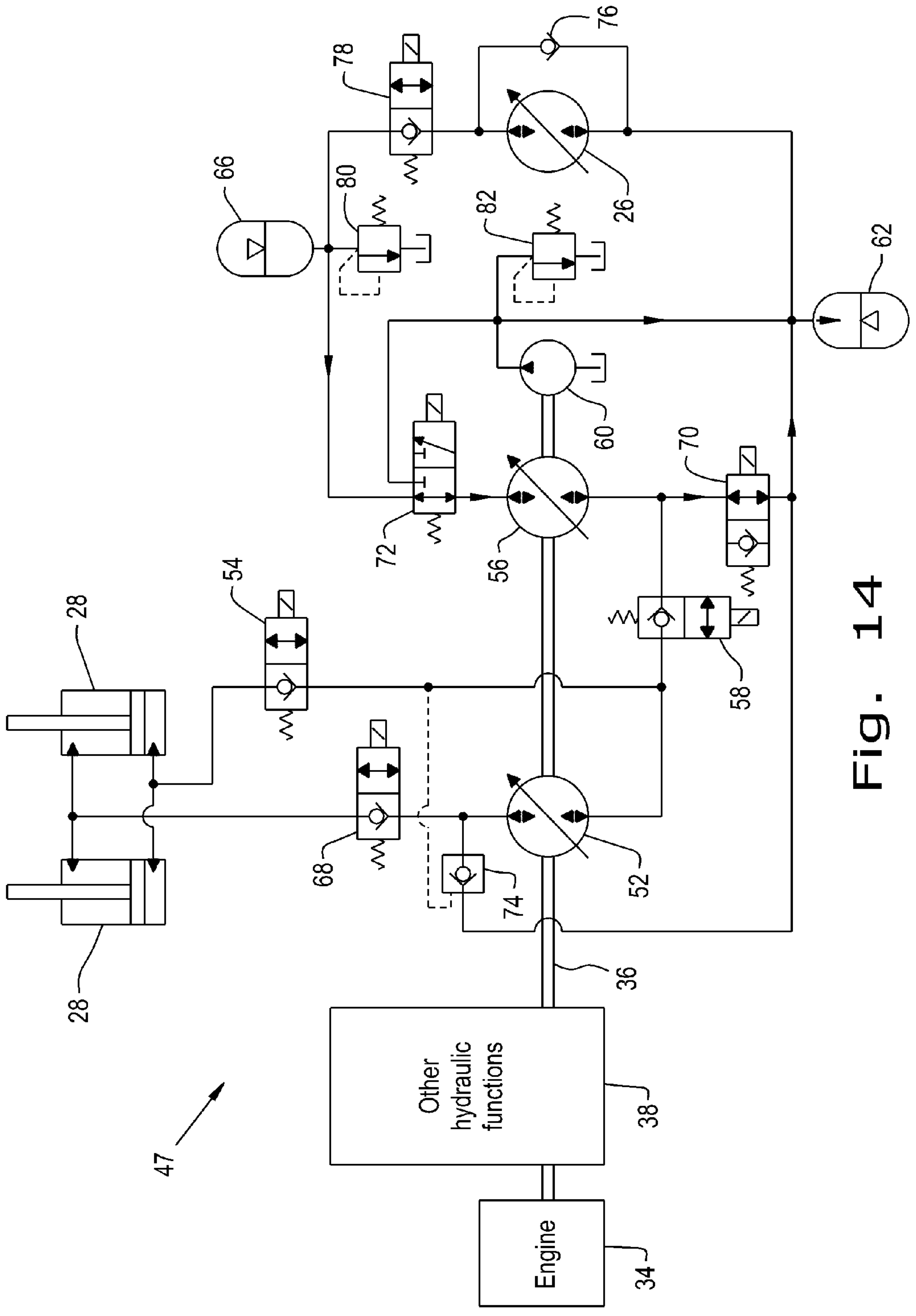
FIG. 14 is a schematic representation of a thirteenth configuration of the embodiment of FIG. 2.

According to another configuration of the present invention, and referring now to FIG. 14, there is shown a hydraulic circuit 47 which is powered by engine shaft 36. First variable displacement pump/motor 52 directs a hydraulic fluid under low pressure through the second load-holding valve 68 and on to the rod side of boom lift hydraulic cylinders 28. Simultaneously, second variable displacement pump/motor 56 directs a hydraulic fluid under low pressure through fifth load-holding valve 50 to low pressure accumulator 62 and boom swing hydraulic motor 26. Also simultaneously, charge pump 60 directs a hydraulic fluid under low pressure to low pressure accumulator 62, boom swing hydraulic motor 26, first variable displacement pump/motor 52, and second variable displacement pump/motor 56. High pressure accumulator 66 assists second variable displacement pump/motor 56.

Figure 15:
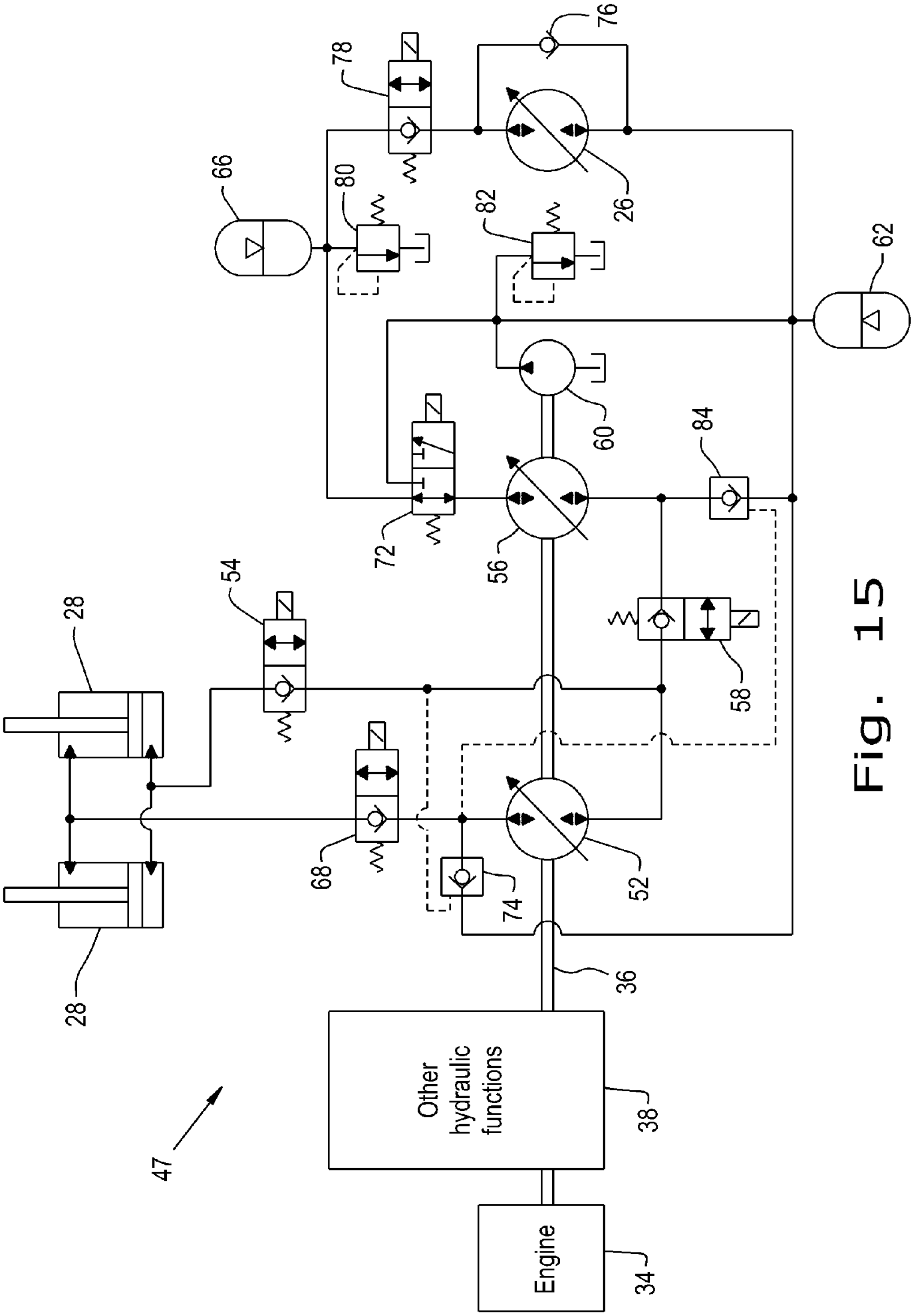
FIG. 15 is a schematic representation of a second embodiment of a hydraulic circuit for the excavator of FIG. 1 or other heavy equipment machine.

Referring now to FIG. 15, with continued reference to FIG. 2, a second embodiment of the invention is shown as hydraulic circuit 48. With the exception of the elimination of fifth load-holding valve 70 and its substitution with second pilot-operated check valve 84, all other components remain as previously described.

Figure 16:
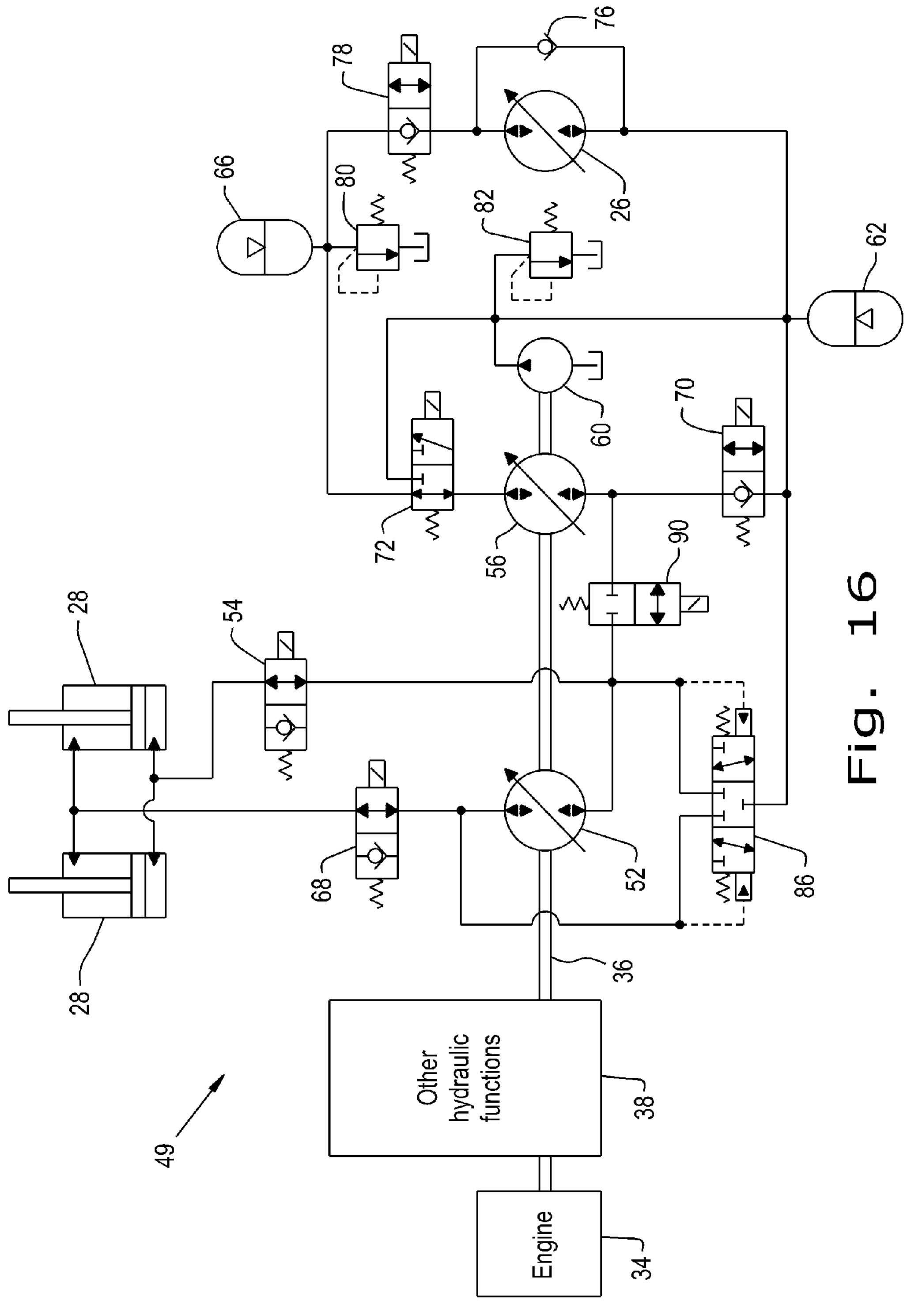
FIG. 16 is a schematic representation of a third embodiment of a hydraulic circuit for the excavator of FIG. 1 or other heavy equipment machine.

Referring now to FIG. 16, with continued reference to FIG. 2, a third embodiment of the invention is shown as hydraulic circuit 49. With the exception of the elimination of third load-holding valve 58 and its substitution with on-off valve 90, and the elimination of pilot-operated check valve 74 and its substitution with flushing valve 86, all other components remain as previously described.

Figure 17:
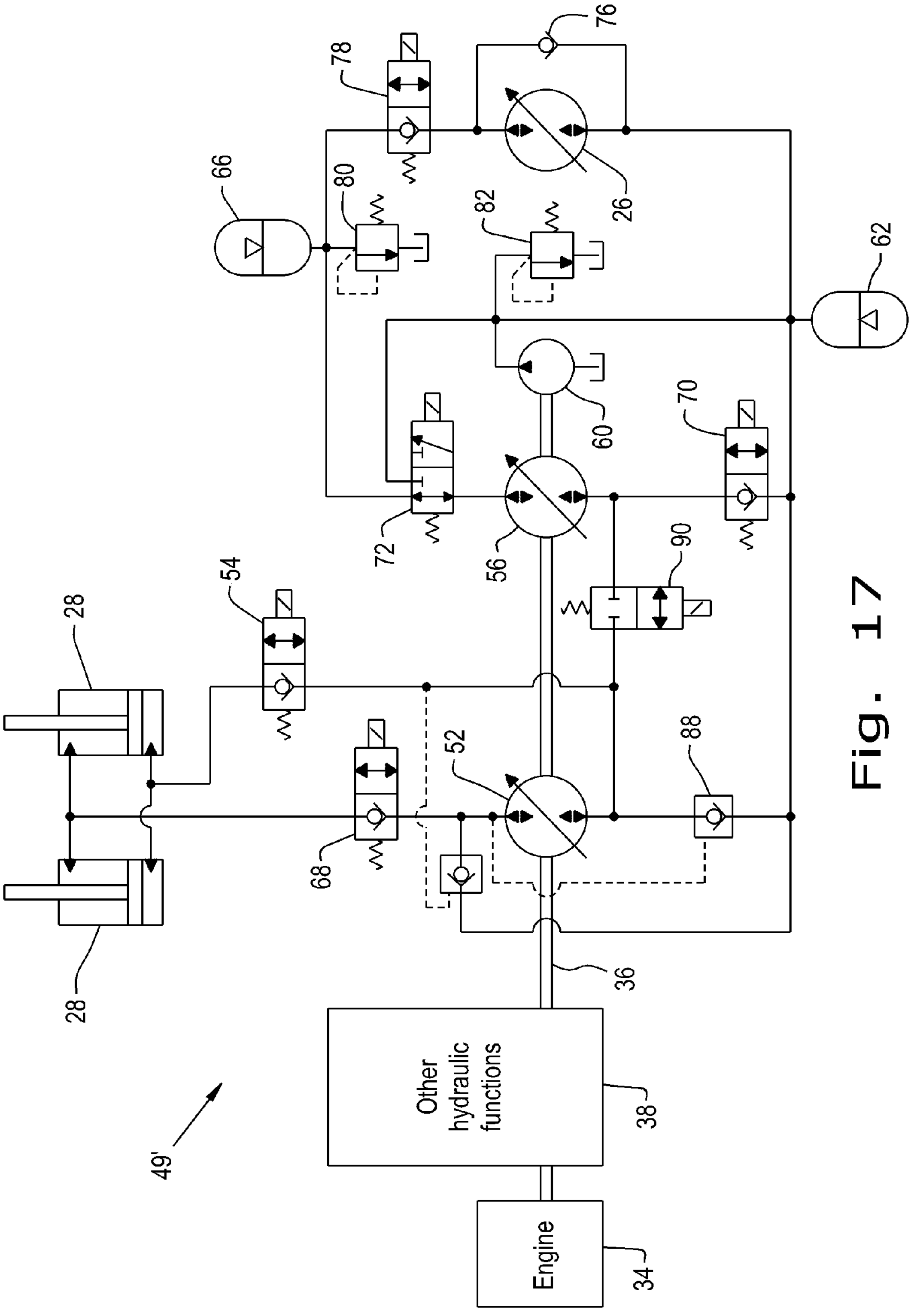
FIG. 17 is a schematic representation of a fourth embodiment of a hydraulic circuit for the excavator of FIG. 1 or other heavy equipment machine.

Referring now to FIG. 17, with continued reference to FIG. 2, a fourth embodiment of the invention is shown as hydraulic circuit 49'. With the exception of the elimination of third load-holding valve 58 and its substitution with on-off valve 90, and the addition of third pilot-operated check valve 88, all other components remain as previously described.

Figure 18:
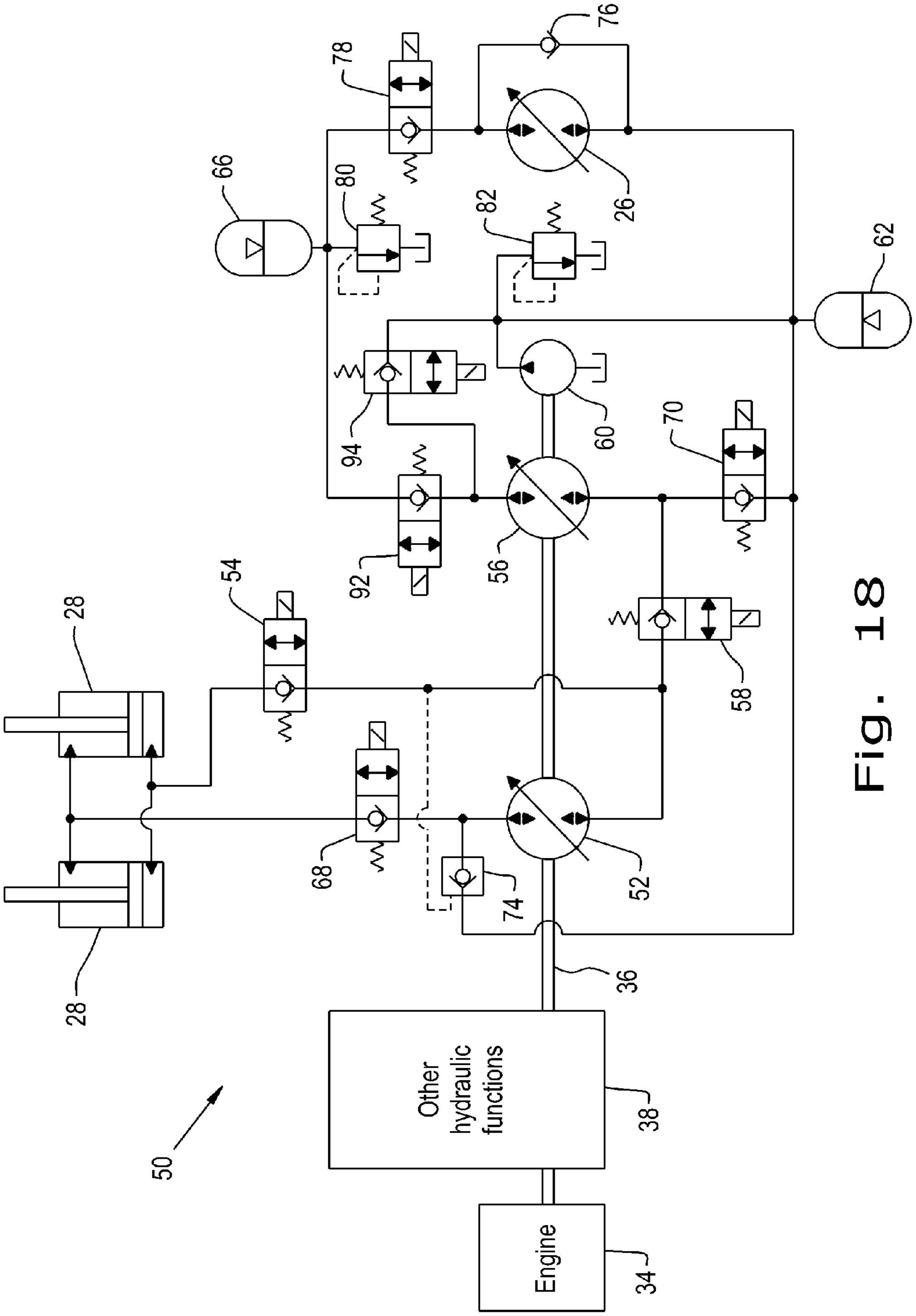
FIG. 18 is a schematic representation of a fifth embodiment of a hydraulic circuit for the excavator of FIG. 1 or other heavy equipment machine.

Referring now to FIG. 18, with continued reference to FIG. 2, a fifth embodiment of the invention is shown as hydraulic circuit 50. With the exception of the elimination of bi-directional valve 72 and its substitution with fifth load-holding valve 92 and sixth load-holding valve 94, all other components remain as previously described.

Figure 19:
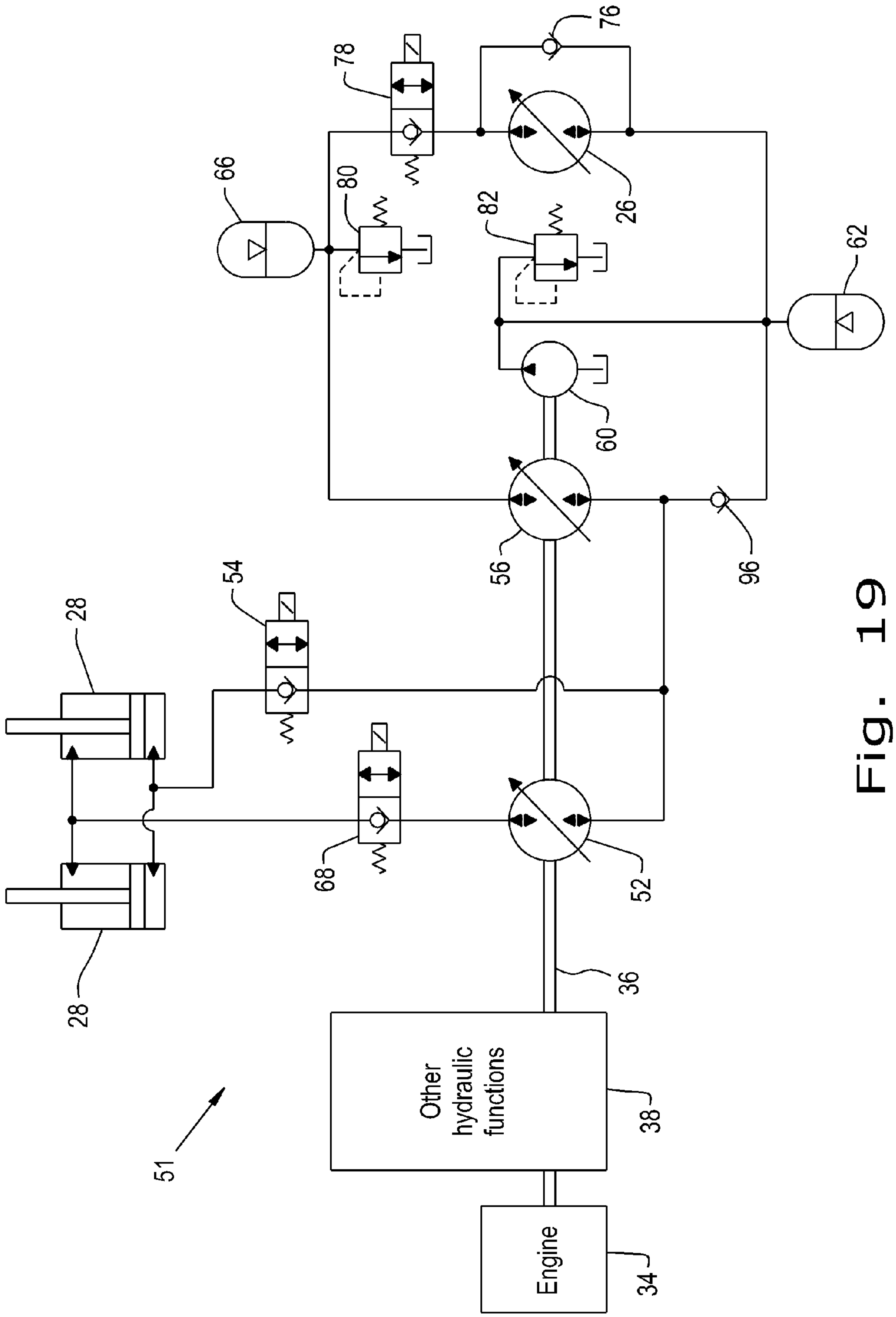
FIG. 19 is a schematic representation of a sixth embodiment of a hydraulic circuit for the excavator of FIG. 1 or other heavy equipment machine.

Referring now to FIG. 19, with continued reference to FIG. 2, a sixth embodiment of the invention is shown as hydraulic circuit 51. This circuit, in the simplest form of the invention, could be built with any combination of components shown in any other embodiment, depending upon the desired system behavior. In this simplified embodiment, several valves have been removed from the embodiment described in the primary aspect: first pilot-operated check valve 74, third load-holding valve 58, and bi-directional valve 72. In addition, fifth load-holding valve 70 has been removed and replaced by second check valve 96. All other components remain as previously described.

Figure 20:
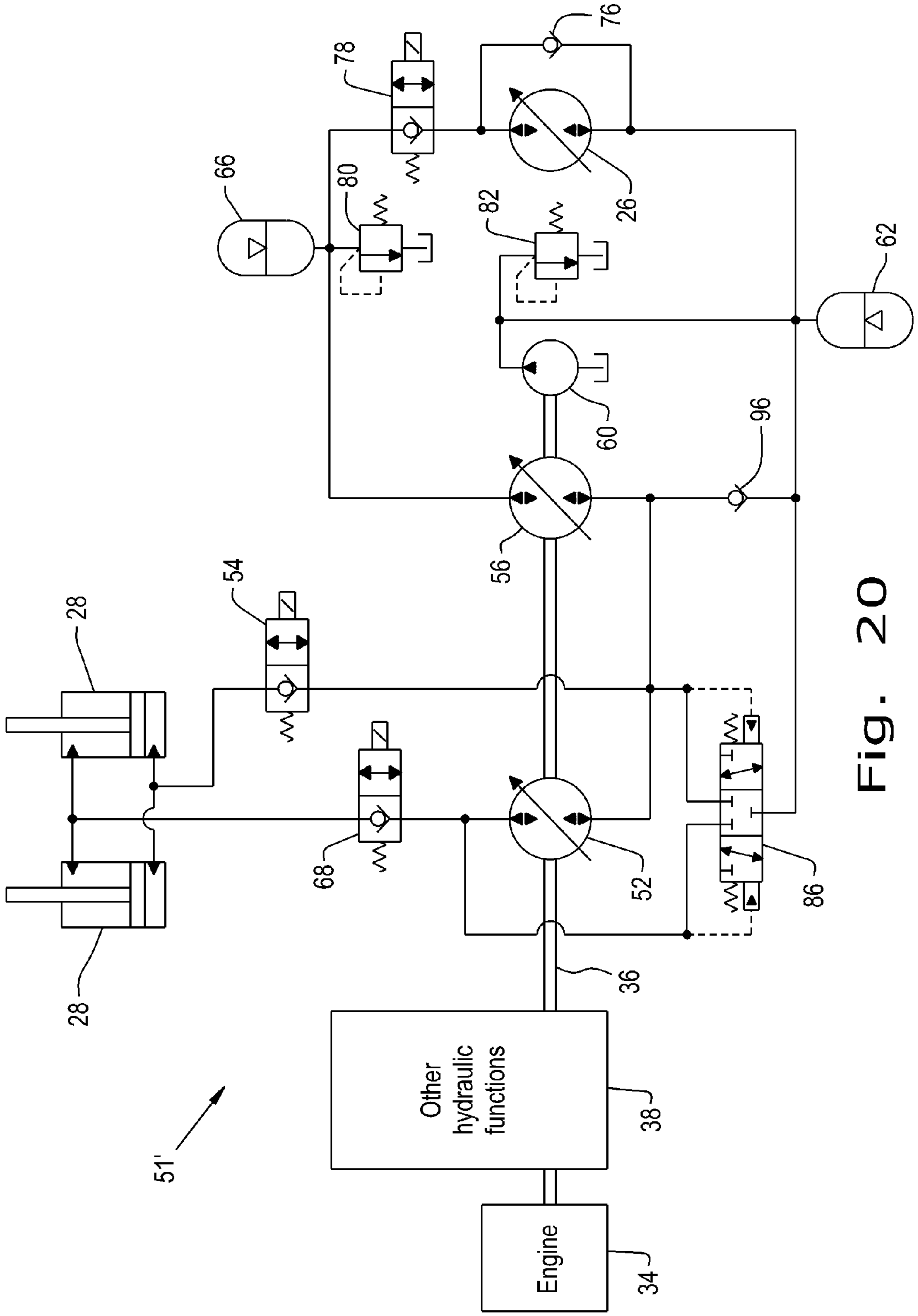
FIG. 20 is a schematic representation of a seventh embodiment of a hydraulic circuit for the excavator of FIG. 1 or other heavy equipment machine.

Similar to hydraulic circuit 51, and referring now to FIG. 20 with continued reference to FIGS. 2 and 19, a seventh embodiment of the invention is shown as hydraulic circuit 51'. All components are similar to those shown and described in FIGS. 2 and 19, with the exception of the addition of flushing valve 86.

In all embodiments, one pump/motor is primarily used to control a linear actuator with no proportional flow control valves. A different pump/motor is used to provide pressure and flow in combination with an accumulator to a variable displacement rotary motor. The linear motor (cylinder) could be a boom or any other type of linear motor (cylinder), though a boom is most advantageous because of the energy recovery. The rotary motor could be a swing or any other type of rotary motor such as a drive wheel for vehicle travel (for example in a wheel loader application); it is best if there is potential for energy recovery.

Figure 21:
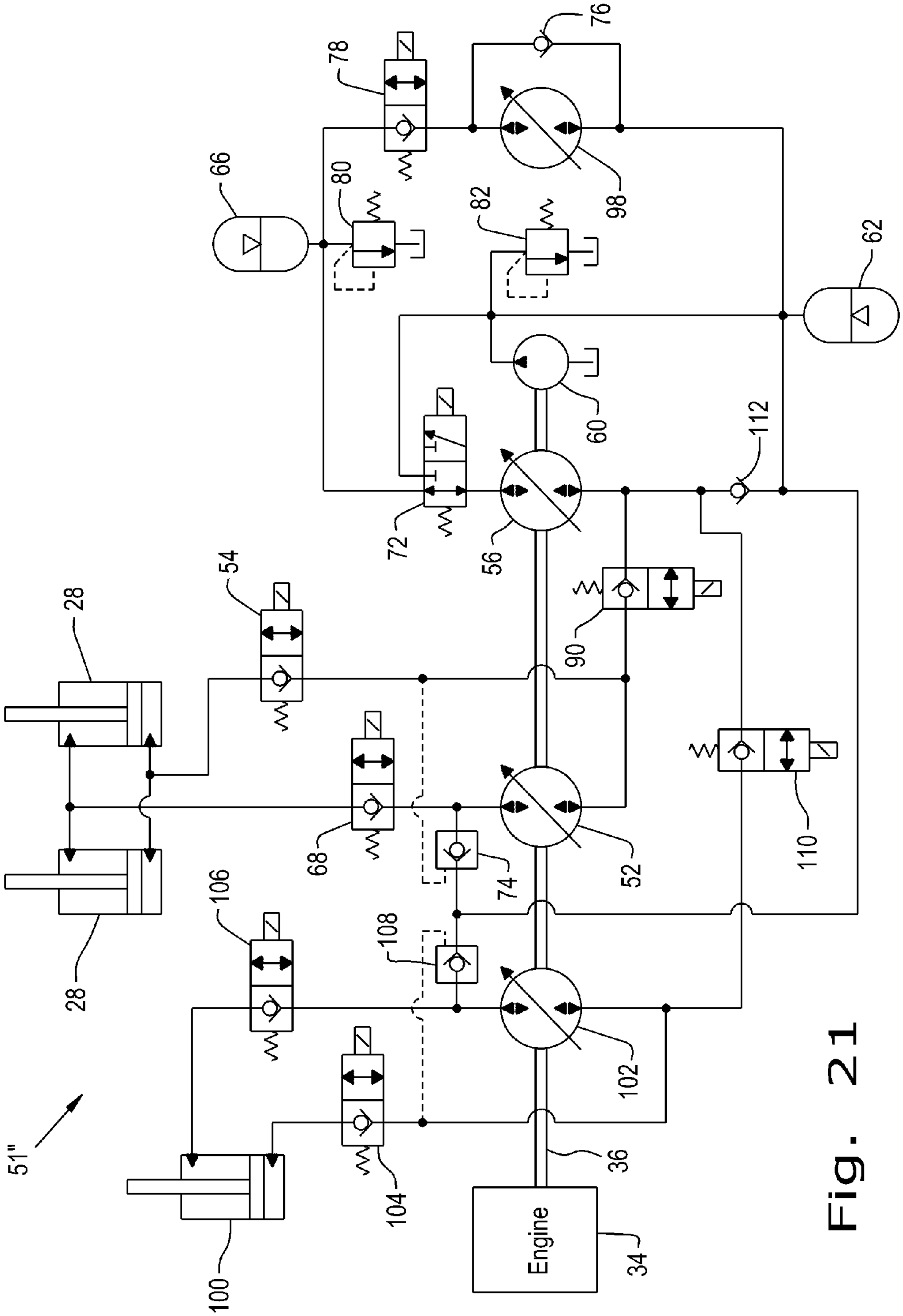
FIG. 21 is a schematic representation of a eighth embodiment of a hydraulic circuit for the excavator of FIG. 1 or other heavy equipment machine.

Referring now to FIG. 21, with continued reference to FIG. 2, a sixth embodiment of the invention is shown as hydraulic circuit 51". This embodiment can be used in a wheel loader, for example. This sixth embodiment is similar to the embodiment shown in FIG. 2, with the addition of a separate branch of the circuit for controlling implement 24, and boom swing hydraulic motor 26 replaced by travel hydraulic motor 98. Implement 24 could be a bucket, for example, and there may be multiple travel hydraulic motors 98. Additional components of the branch include implement hydraulic cylinder 100, third variable displacement pump/motor 102; seventh load-holding valve 104, eighth load-holding valve 106, and ninth load-holding valve 110; fourth pilot-operated check valve 108; and second check valve 112. All other components remain as previously described.

There are many benefits of the sixth embodiment of FIG. 21, expanding upon previously described advantages of the invention. It provides for valveless control of the boom and bucket for energy savings. It provides for a hybrid travel circuit for energy recovery/storage. The travel pump can be used to supplement the boom or bucket pump for high speed lowering or dumping without having to oversize the pumps. All boom lowering and bucket dumping energy is recovered, minus the pump losses, and can be stored in accumulators if needed. Any travel braking energy can be recovered. The travel motor(s) could be used for engine automatic start/shut-off for fuel savings. Cooling demands are greatly reduced due to the high efficiency system. Brake wear and power requirements are reduced as braking would be done while recovering energy hydraulically. If two or four travel motors are used, independent torque control of the wheels could be set up, eliminating the need for electro-hydraulic braking . . . all of the benefits of electro-hydraulic braking are achieved, while reducing brake wear and recovering energy.

While a hydraulic circuit has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work machine, comprising:

a chassis;

an engine carried by the chassis;

a boom pivotally coupled to the chassis and operated by at least one boom swing hydraulic motor coupled to the boom to pivot the boom about a vertical axis;

a dipper pivotally coupled to the boom;

an implement pivotally coupled to the dipper; and a hydraulic system powered by a shaft of the engine to control a plurality of hydraulic cylinders including at least one boom lift hydraulic cylinder coupled to the boom to pivot the boom about a horizontal axis, a dipper hydraulic cylinder coupled to the dipper to pivot the dipper about a horizontal axis, and an implement hydraulic cylinder coupled to the implement to pivot the implement about a horizontal axis, the hydraulic system comprising:

a first variable displacement pump/motor delivering a fluid either through a first load-holding valve to a head side of the at least one boom lift hydraulic cylinder or through a second load-holding valve to a rod side of the at least one boom lift hydraulic cylinder;

a second variable displacement pump/motor delivering a fluid either through a bi-directional valve to a high-pressure accumulator or through both a third load-holding valve and the first load-holding valve to the head side of the at least one boom lift hydraulic cylinder; and a charge pump delivering a fluid to a low-pressure accumulator, a boom hydraulic circuit, and a swing hydraulic circuit;

wherein the first variable displacement pump/motor and the second variable displacement pump/motor can be connected to provide a higher flow to the at least one boom lift hydraulic cylinder than a flow achieved by one of the first variable displacement pump/motor or the second variable displacement pump/motor, and the high-pressure accumulator and the first variable displacement pump/motor and the second variable displacement pump/motor can add power back to the engine shaft.

2. The work machine of claim 1, wherein the first variable displacement pump/motor is used as a primary mover for the at least one boom lift hydraulic cylinder and a secondary mover for the boom swing hydraulic motor; and the second variable displacement pump/motor is used as a secondary mover for the at least one boom lift hydraulic cylinder, a primary mover for the boom swing hydraulic motor, and a power assist to the engine shaft.

3. A hydraulic system powered by a shaft of an engine to control a plurality of hydraulic cylinders including at least one boom lift hydraulic cylinder coupled to a boom to pivot the boom about a horizontal axis, a dipper hydraulic cylinder coupled to a dipper to pivot the dipper about a horizontal axis, and an implement hydraulic cylinder coupled to an implement to pivot the implement about a horizontal axis, the hydraulic system comprising:

a first variable displacement pump/motor delivering a fluid either through a first load-holding valve to a head side of the at least one boom lift hydraulic cylinder or through a second load-holding valve to a rod side of the at least one boom lift hydraulic cylinder;

a second variable displacement pump/motor delivering a fluid either through a bi-directional valve to a high-pressure accumulator or through both a third load-holding valve and the first load-holding valve to the head side of the at least one boom lift hydraulic cylinder; and a charge pump delivering a fluid to a low-pressure accumulator, a boom hydraulic circuit, and a swing hydraulic circuit;

wherein the first variable displacement pump/motor and the second variable displacement pump/motor can be connected to provide a higher flow to the at least one boom lift hydraulic cylinder than a flow achieved by one of the first variable displacement pump/motor or the second variable displacement pump/motor, and the high-pressure accumulator and the first variable displacement pump/motor and the second variable displacement pump/motor can add power back to the engine shaft.

4. The hydraulic system of claim 3, wherein the first variable displacement pump/motor is used as a primary mover for the at least one boom lift hydraulic cylinder and a secondary mover for the boom swing hydraulic motor; and the second variable displacement pump/motor is used as a secondary mover for the at least one boom lift hydraulic cylinder, a primary mover for the boom swing hydraulic motor, and a power assist to the engine shaft.

* * * * *